(12) United States Patent
Kawai

(10) Patent No.: US 6,778,312 B2
(45) Date of Patent: Aug. 17, 2004

(54) ELECTROPHORETIC DEVICE METHOD FOR MAKING ELECTROPHORETIC DEVICE, AND ELECTRONIC APPARATUS

(75) Inventor: Hideyuki Kawai, Fujimi (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 10/413,447

(22) Filed: Apr. 14, 2003

(65) Prior Publication Data

US 2004/0085618 A1 May 6, 2004

(30) Foreign Application Priority Data

Apr. 15, 2002 (JP) .......................................... 2002-112553
Apr. 3, 2003 (JP) .......................................... 2003-100931

(51) Int. Cl.[7] .............................................. G02F 1/167
(52) U.S. Cl. ...................................... 359/266; 359/265
(58) Field of Search ................................ 359/266, 265, 359/298; 345/107

(56) References Cited

U.S. PATENT DOCUMENTS 6,312,304 B1    11/2001  Dudhaler et al.
2003/0222315 A1 * 12/2003 Amundson et al. ......... 257/368

* cited by examiner

Primary Examiner—Scott J. Sugarman
Assistant Examiner—Richard Hanig
(74) Attorney, Agent, or Firm—Harness, Dickey & Pierce, P.L.C.

(57) ABSTRACT

An electrophoretic device 20 is provided which includes a circuit board 1 provided with a plurality of pixel electrodes 3, a transparent electrode (counter electrode) 4 opposed to the individual pixel electrodes 3, an electrophoretic dispersion layer 11 containing an electrophoretic dispersion 11, the electrophoretic dispersion layer 11 being partially interposed between the electrodes, a plurality of thin-film transistors 30 disposed on a surface of the circuit board 1 remote from the electrophoretic dispersion layer 11, and conducting parts 8 extending through the circuit board 1 and electrically connecting the pixel electrodes 3 and the thin-film transistors to each other.

43 Claims, 23 Drawing Sheets

[Fig. 1]
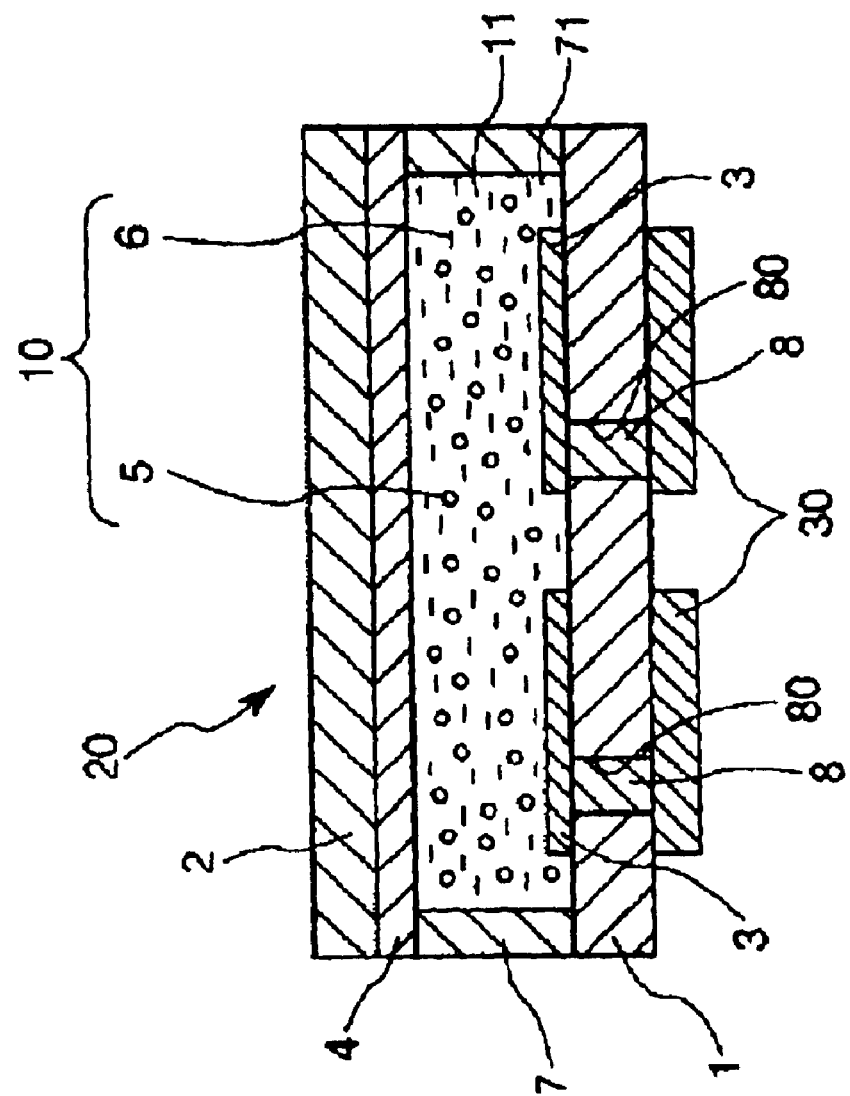

[Fig. 2]
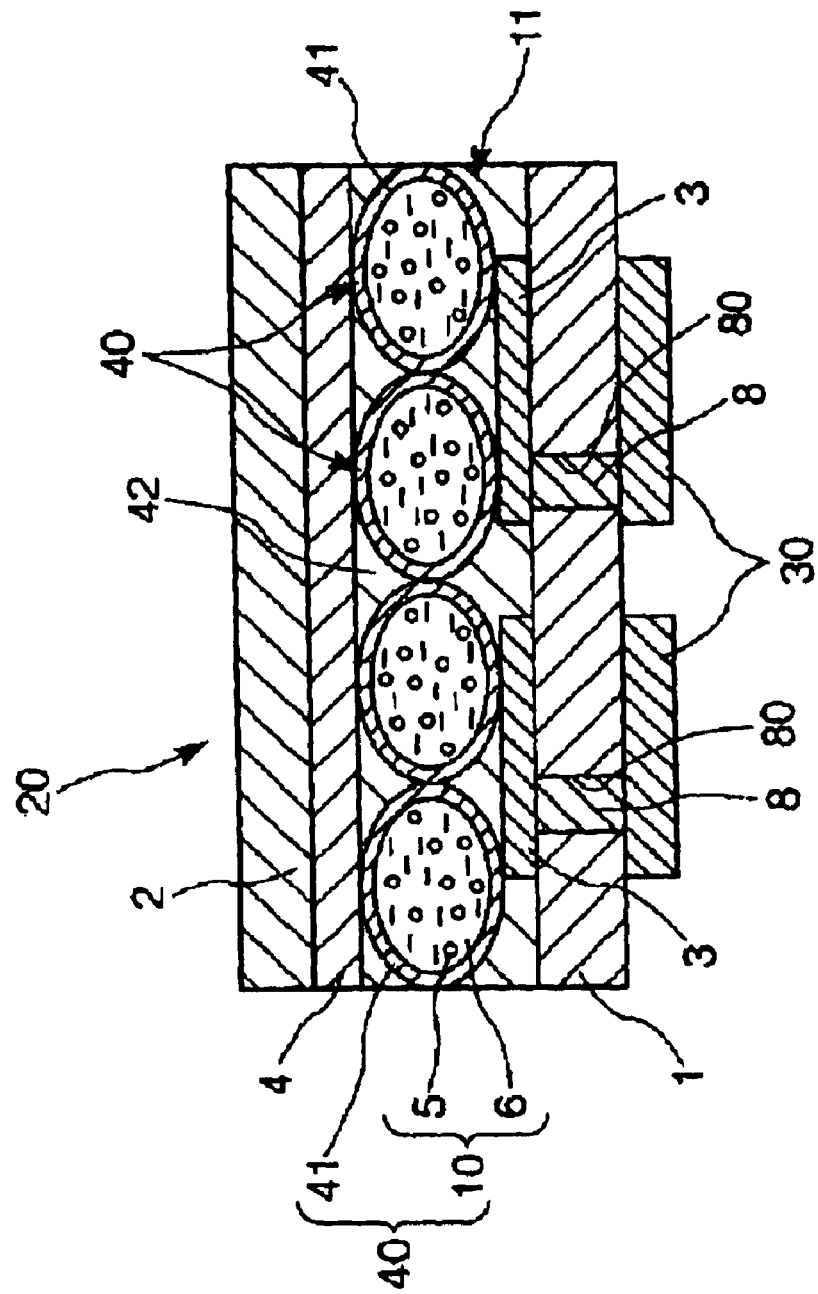

[Fig. 3]
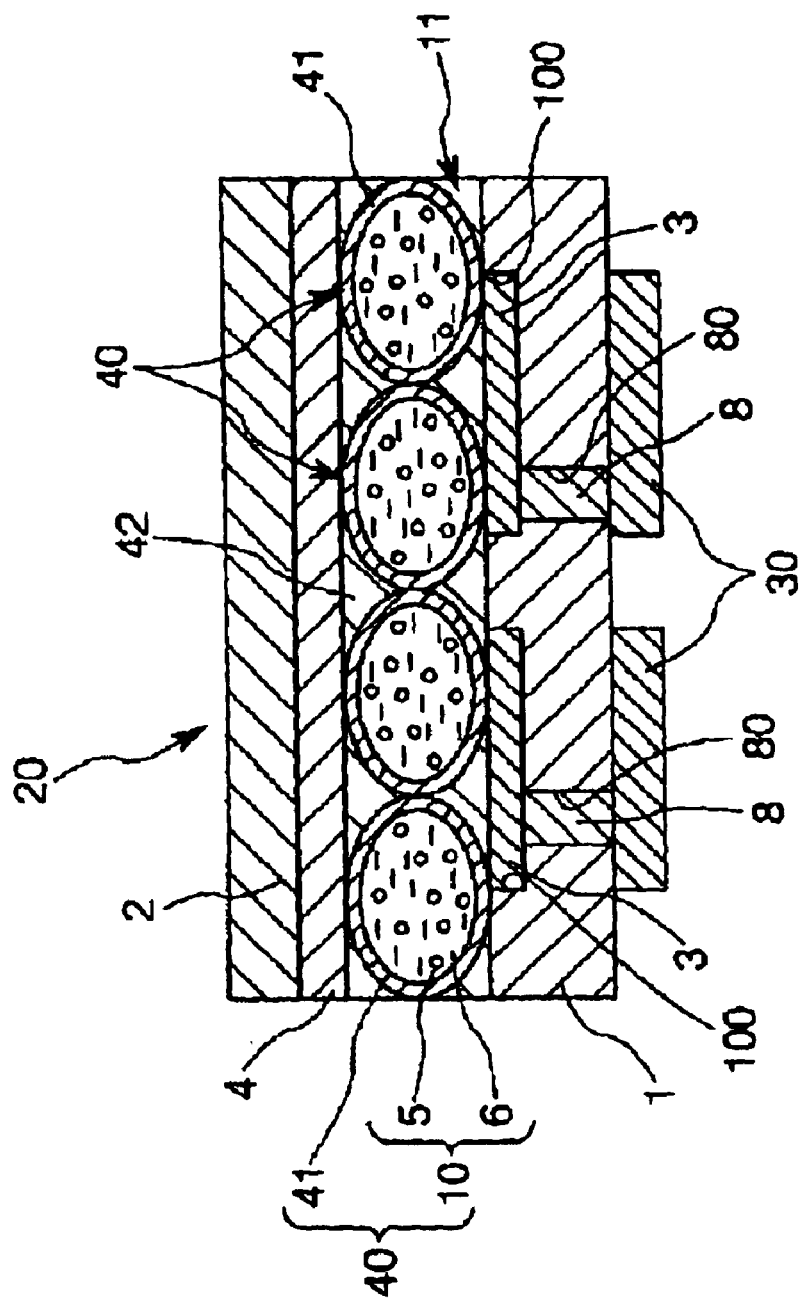

[Fig. 4]
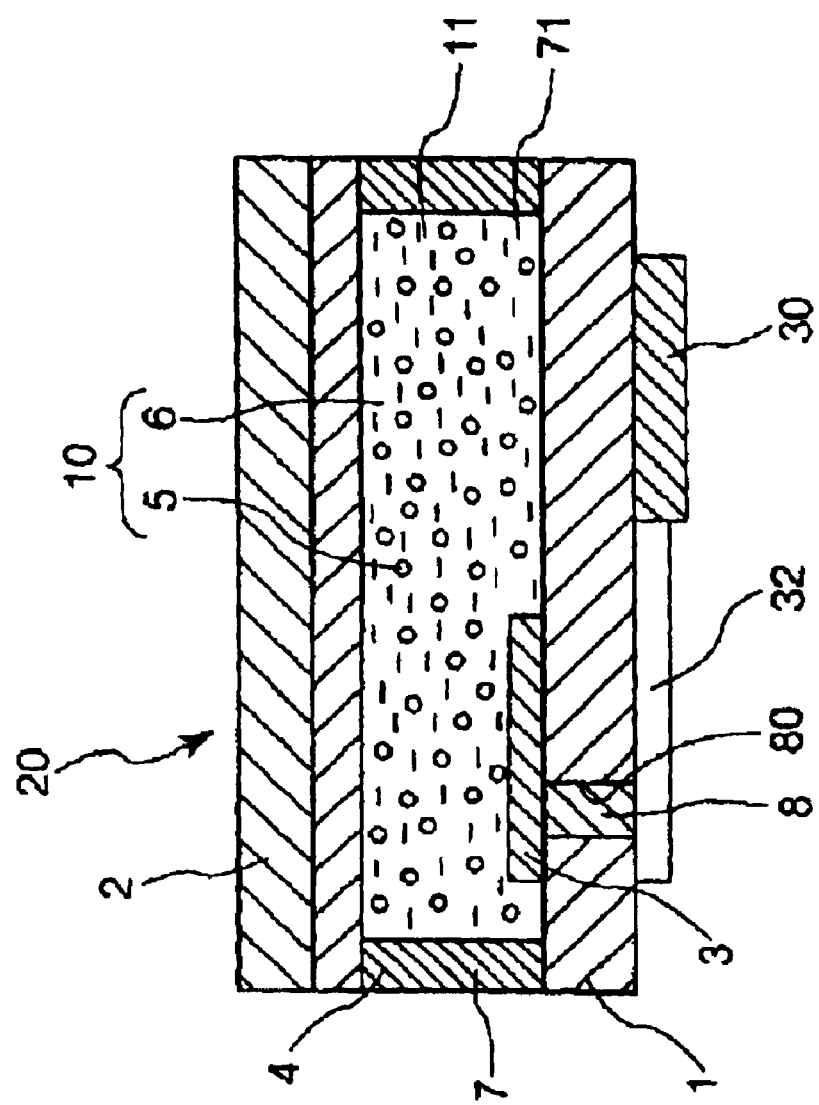

[Fig. 5]
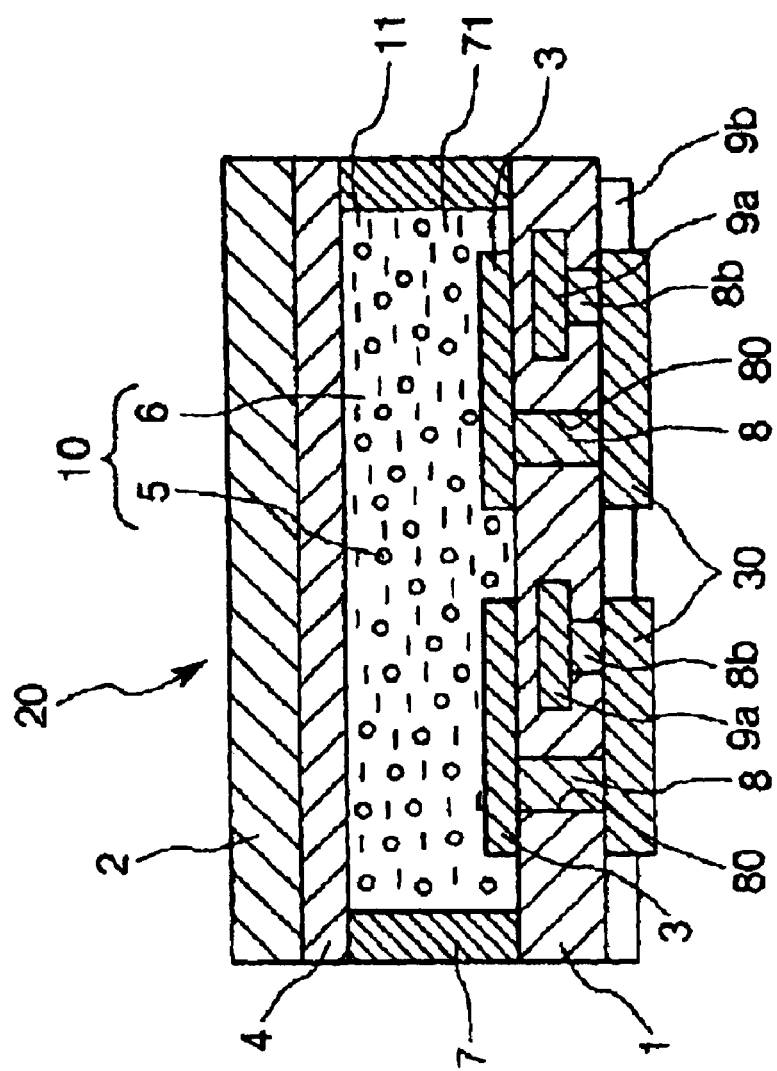

[Fig. 6]
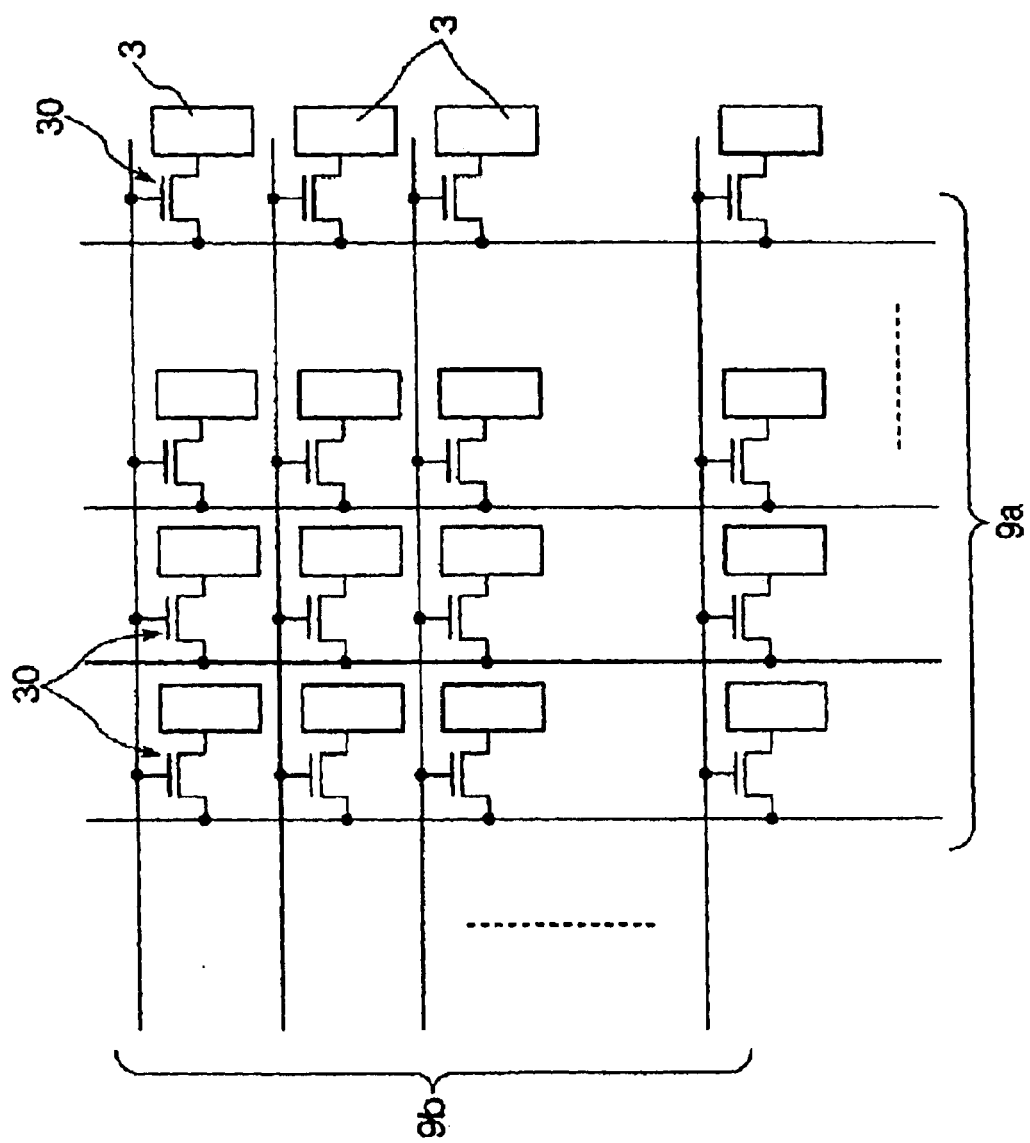

[Fig. 7]
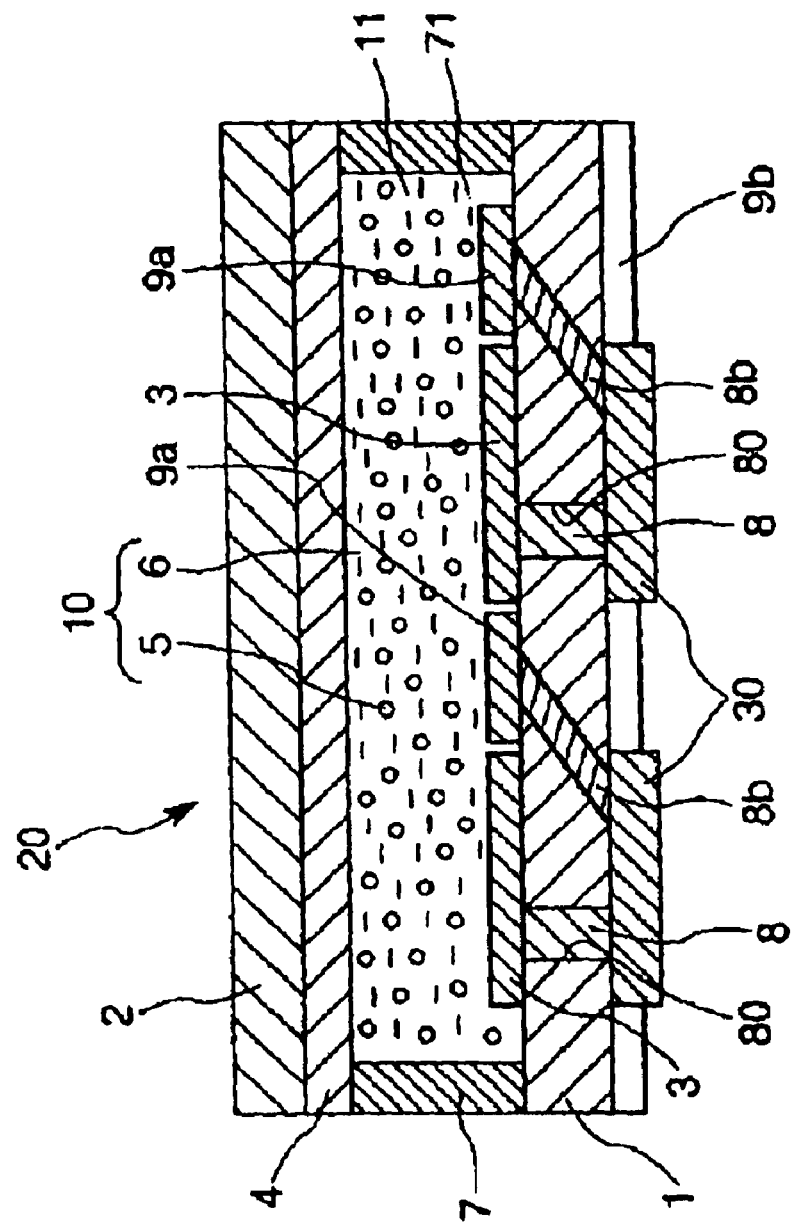

[Fig. 8]
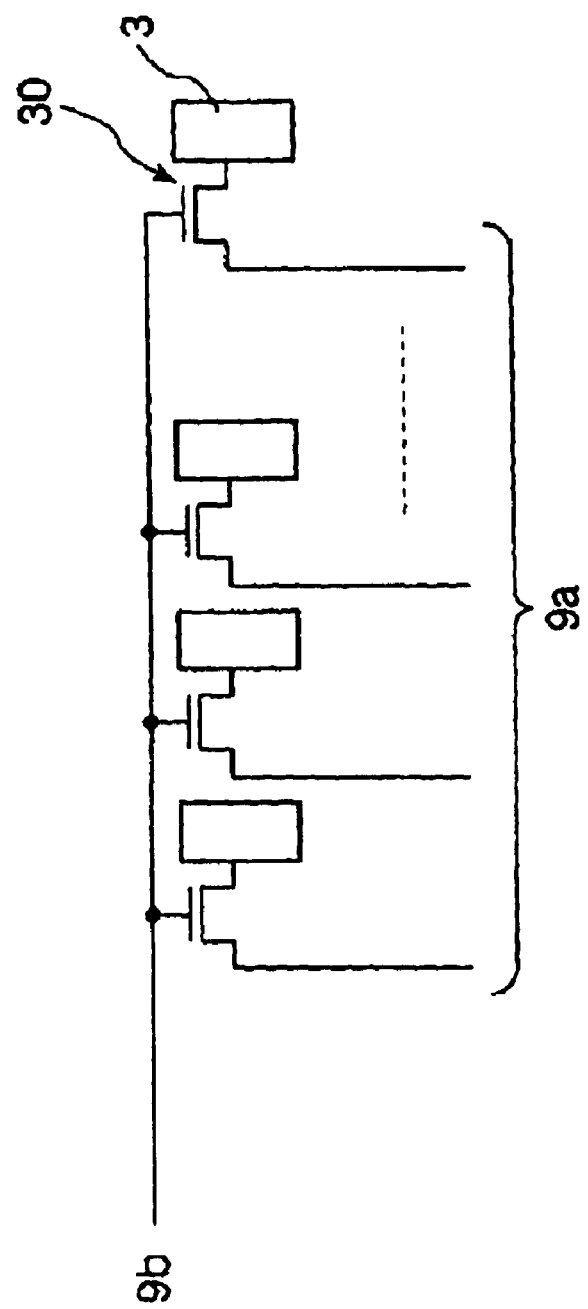

[Fig. 9]
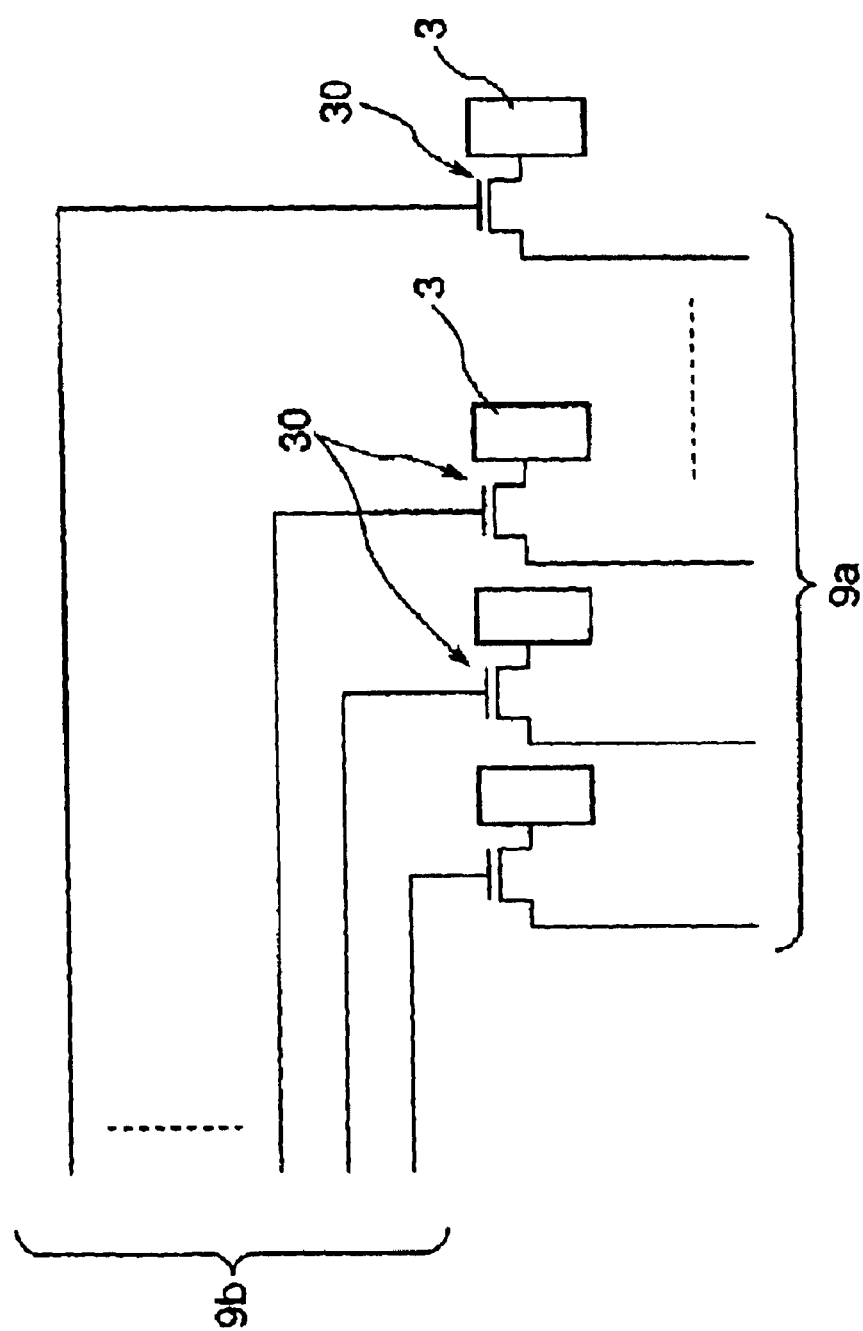

[Fig. 10]
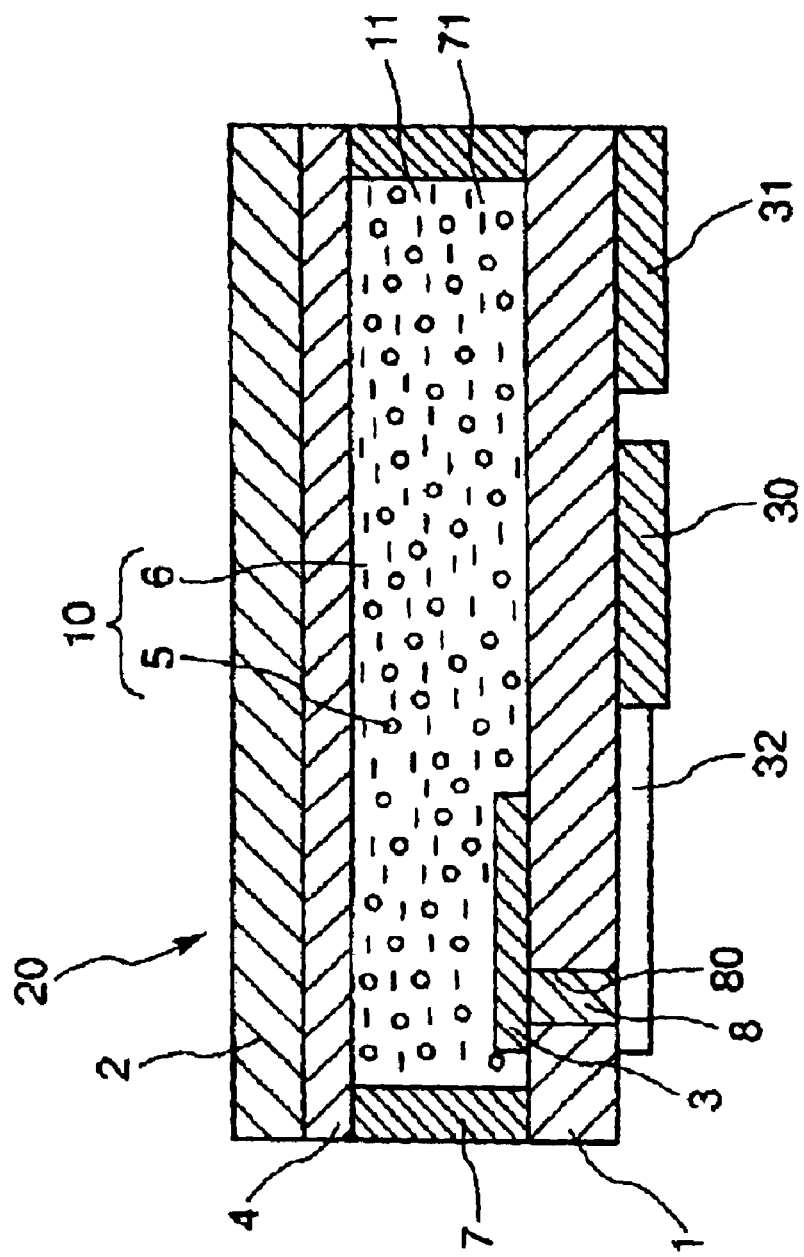

[Fig. 11]
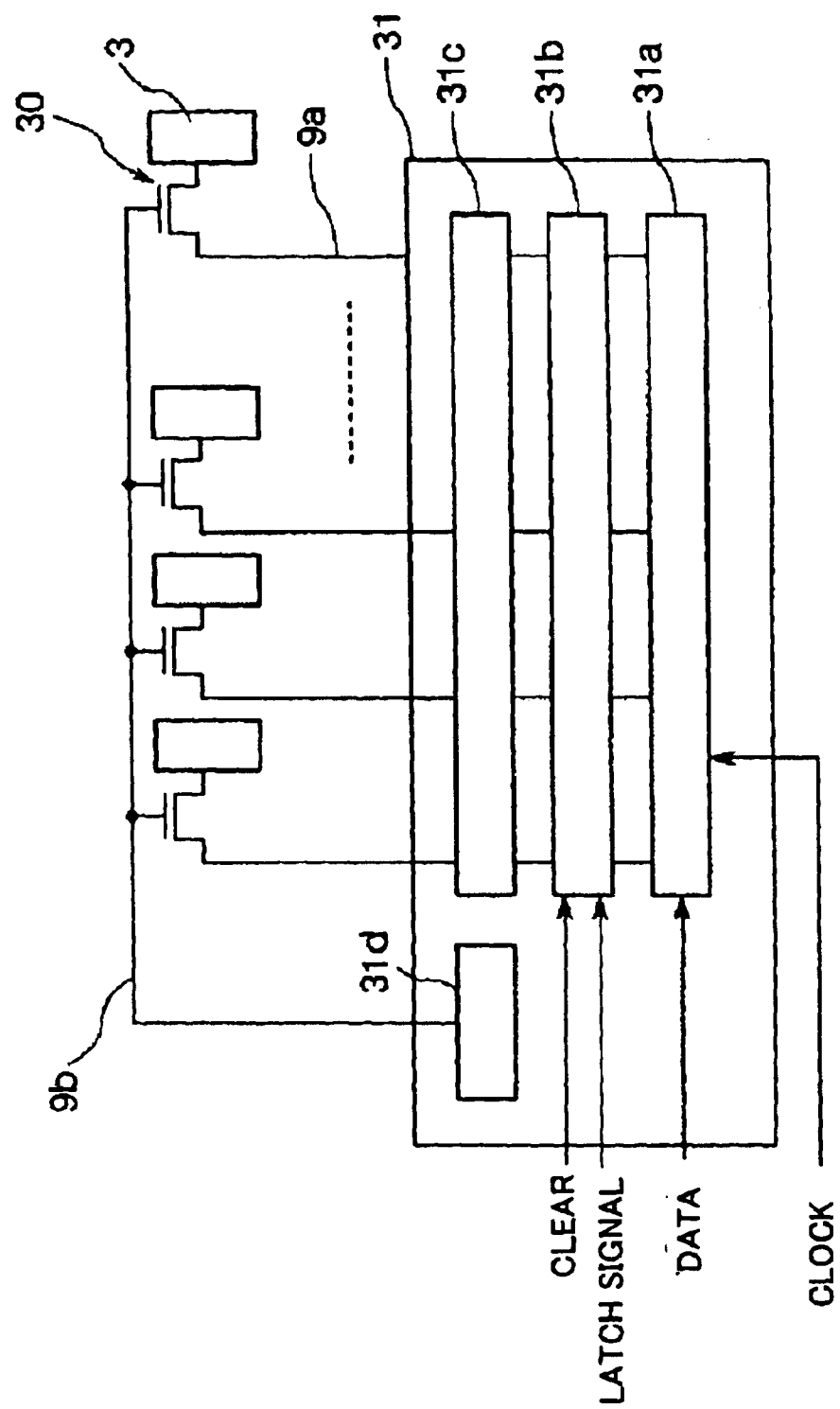

[Fig. 12]
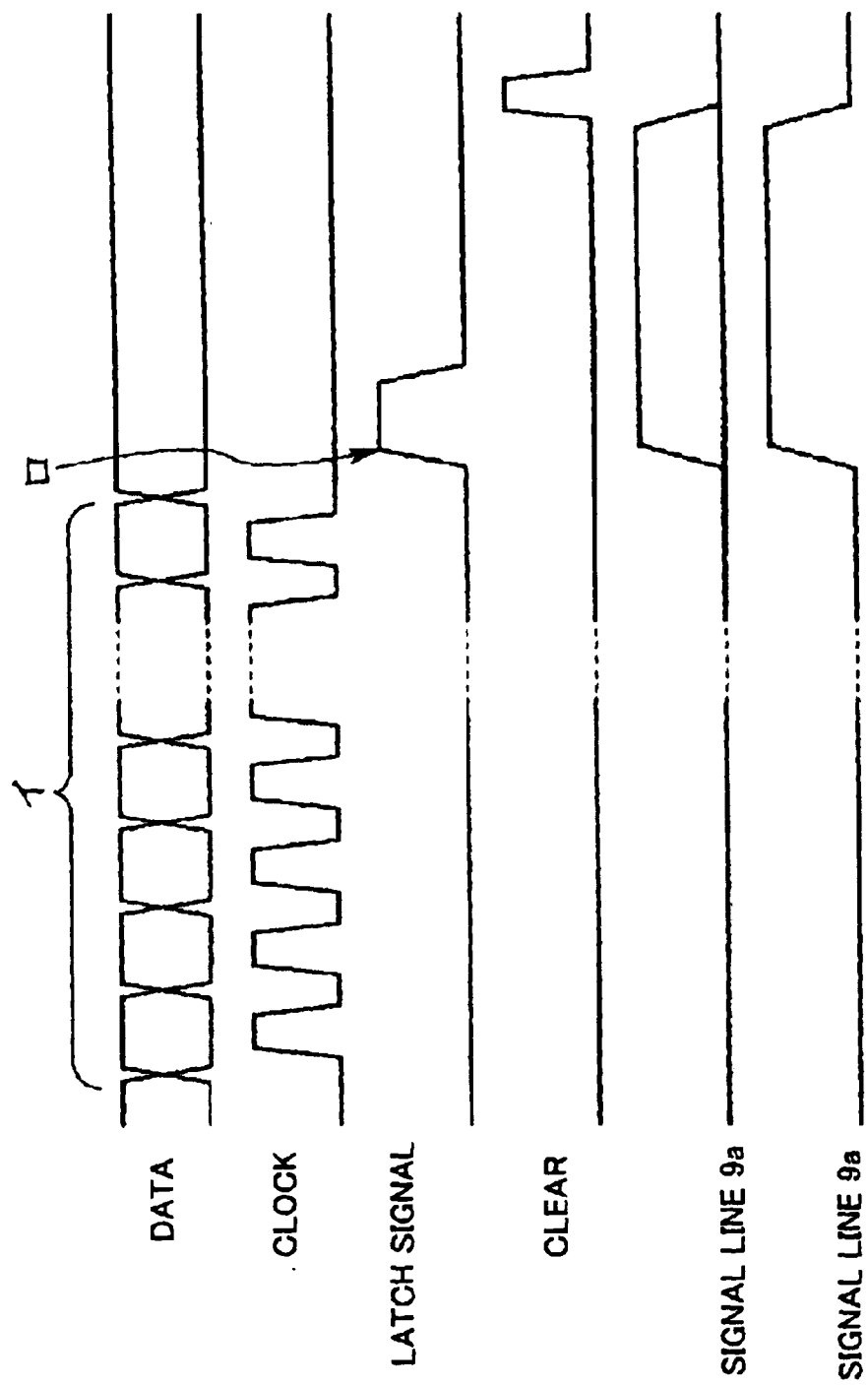

[Fig. 13]
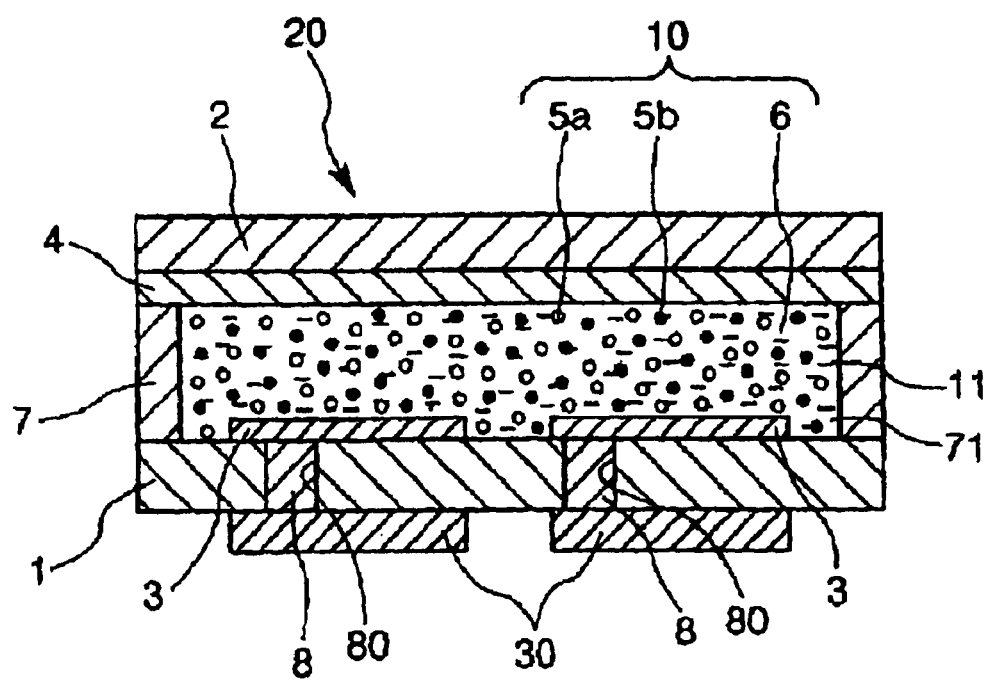

[Fig. 14]
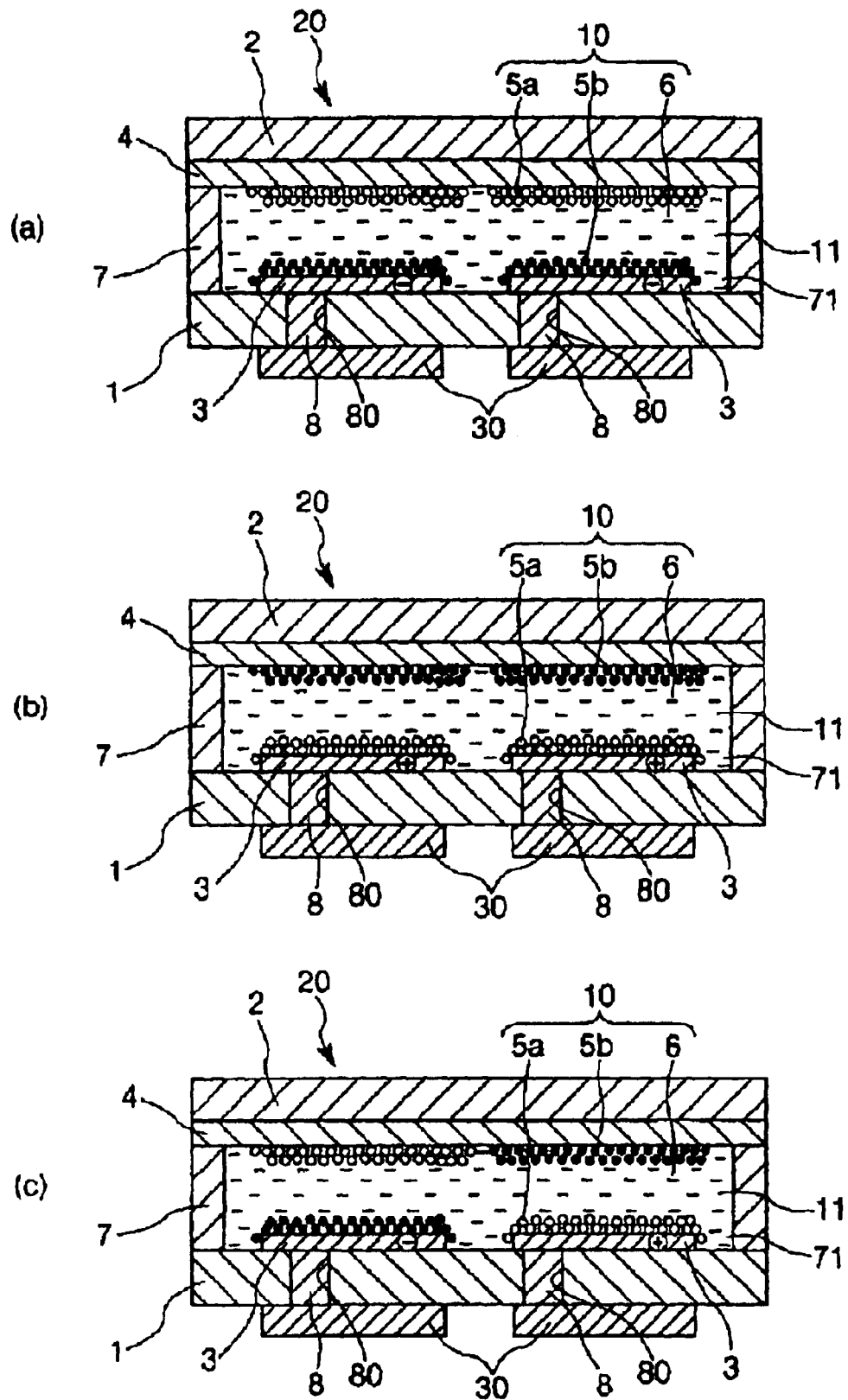

[Fig. 15]
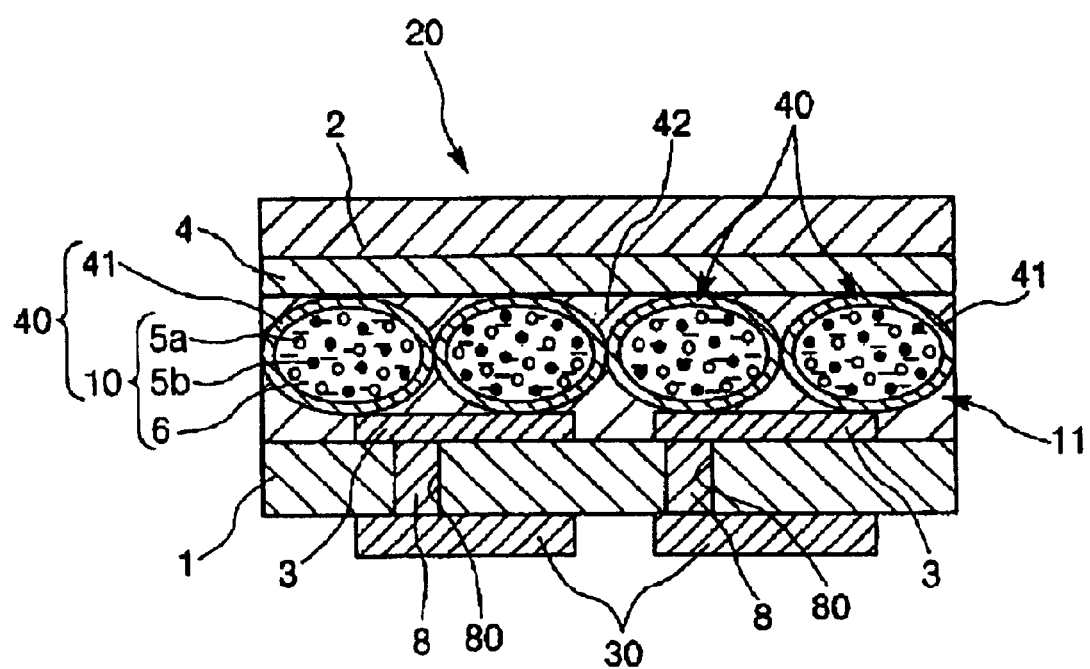

[Fig. 16]
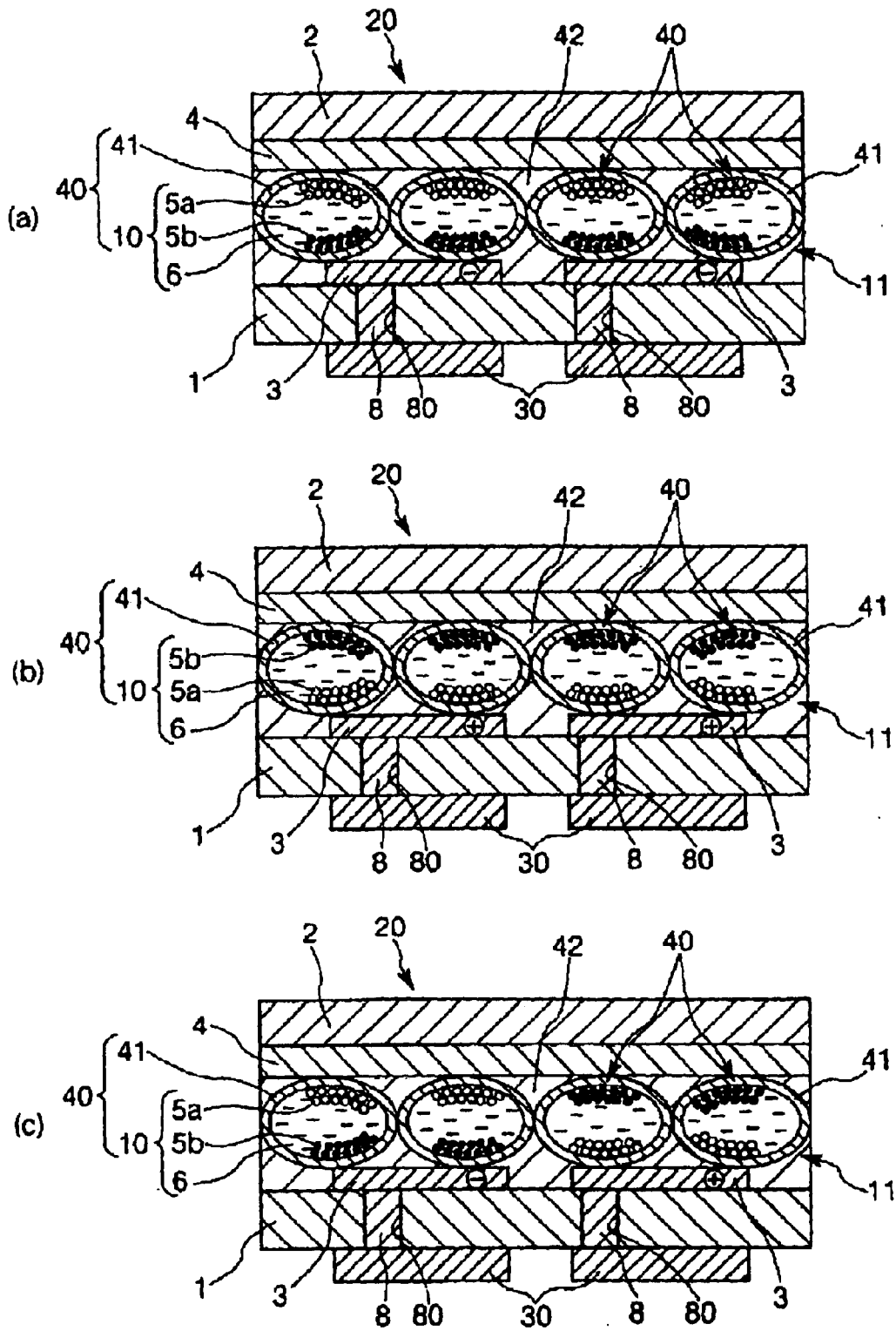

[Fig. 17]
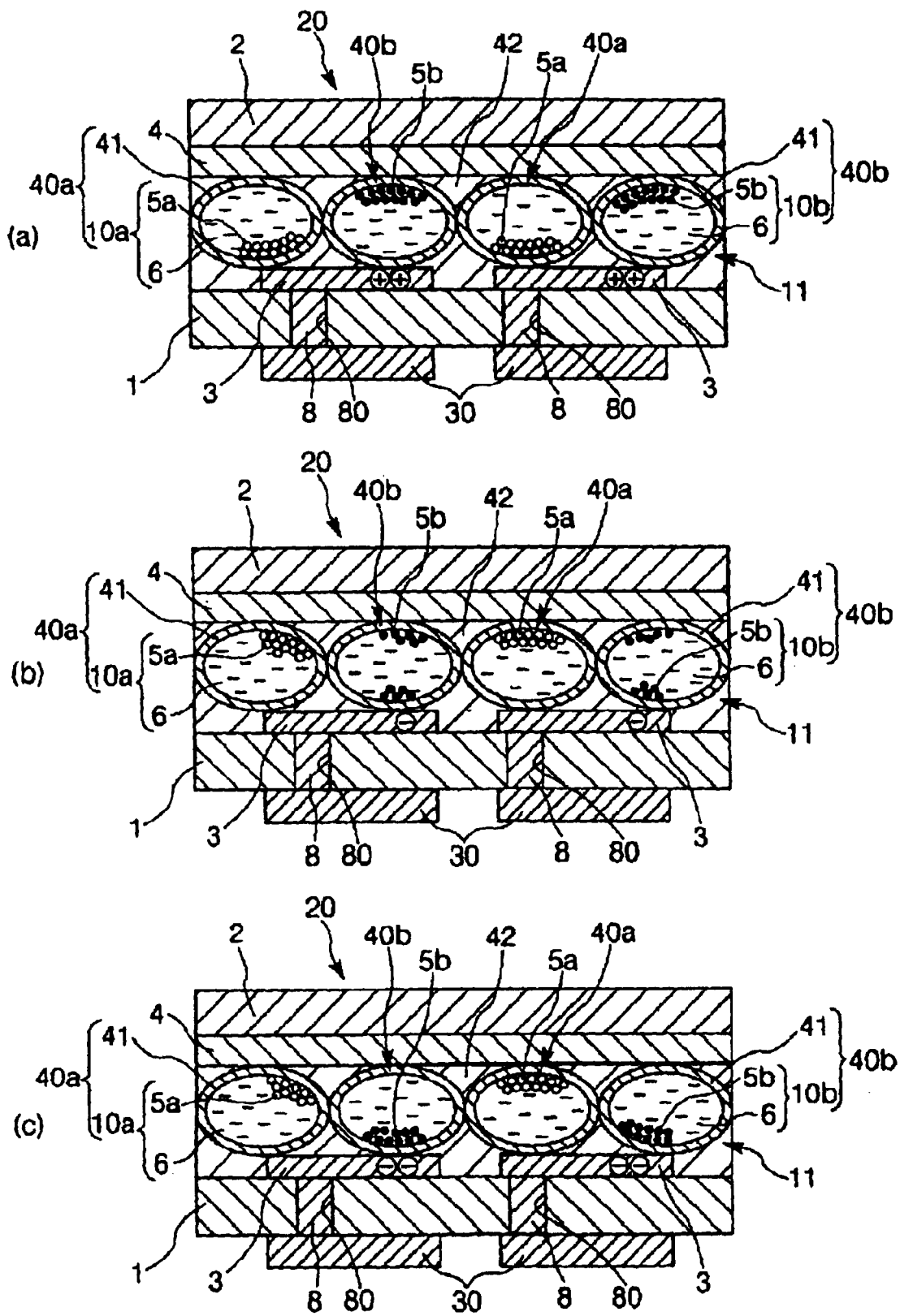

[Fig. 18]
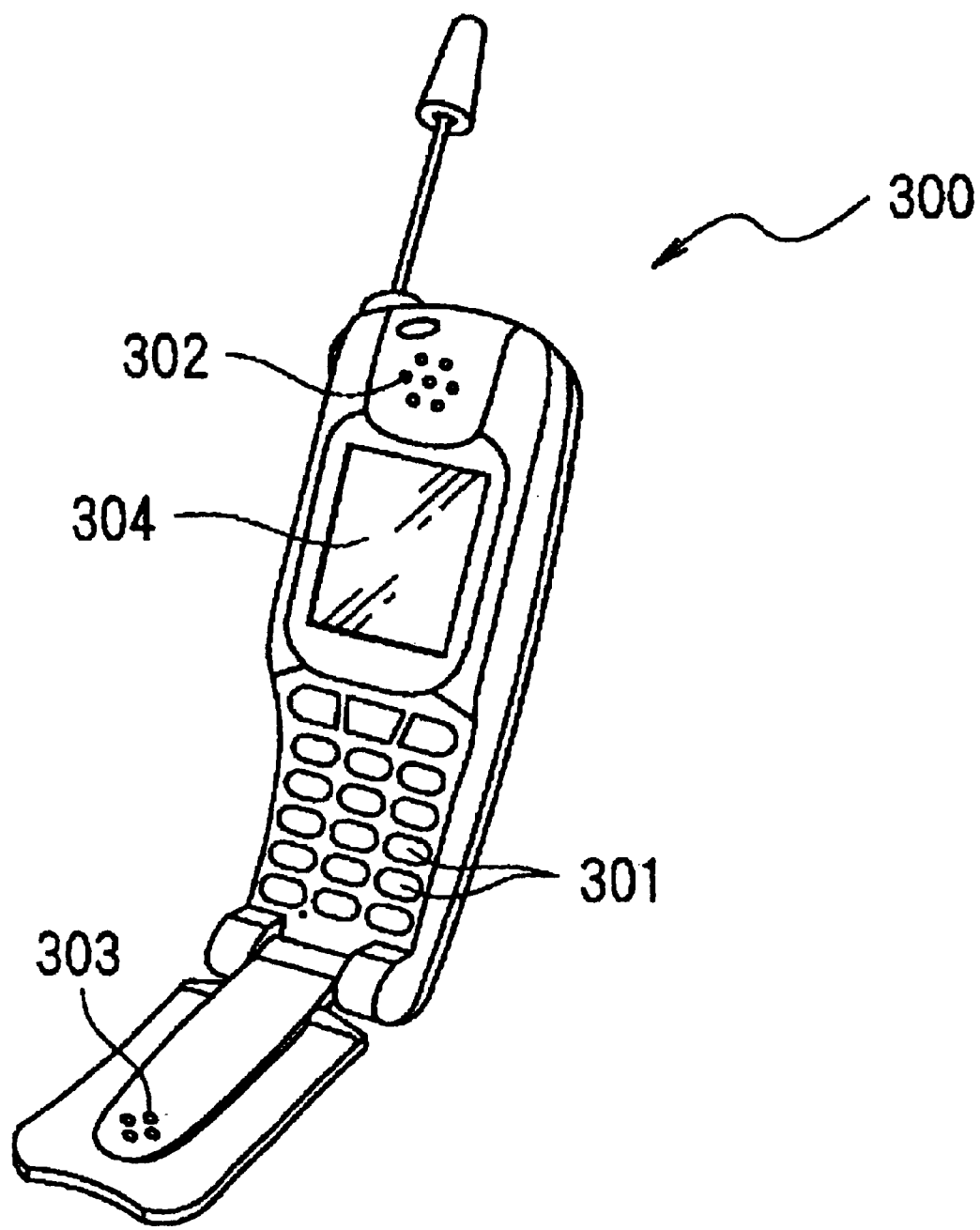

[Fig. 19]
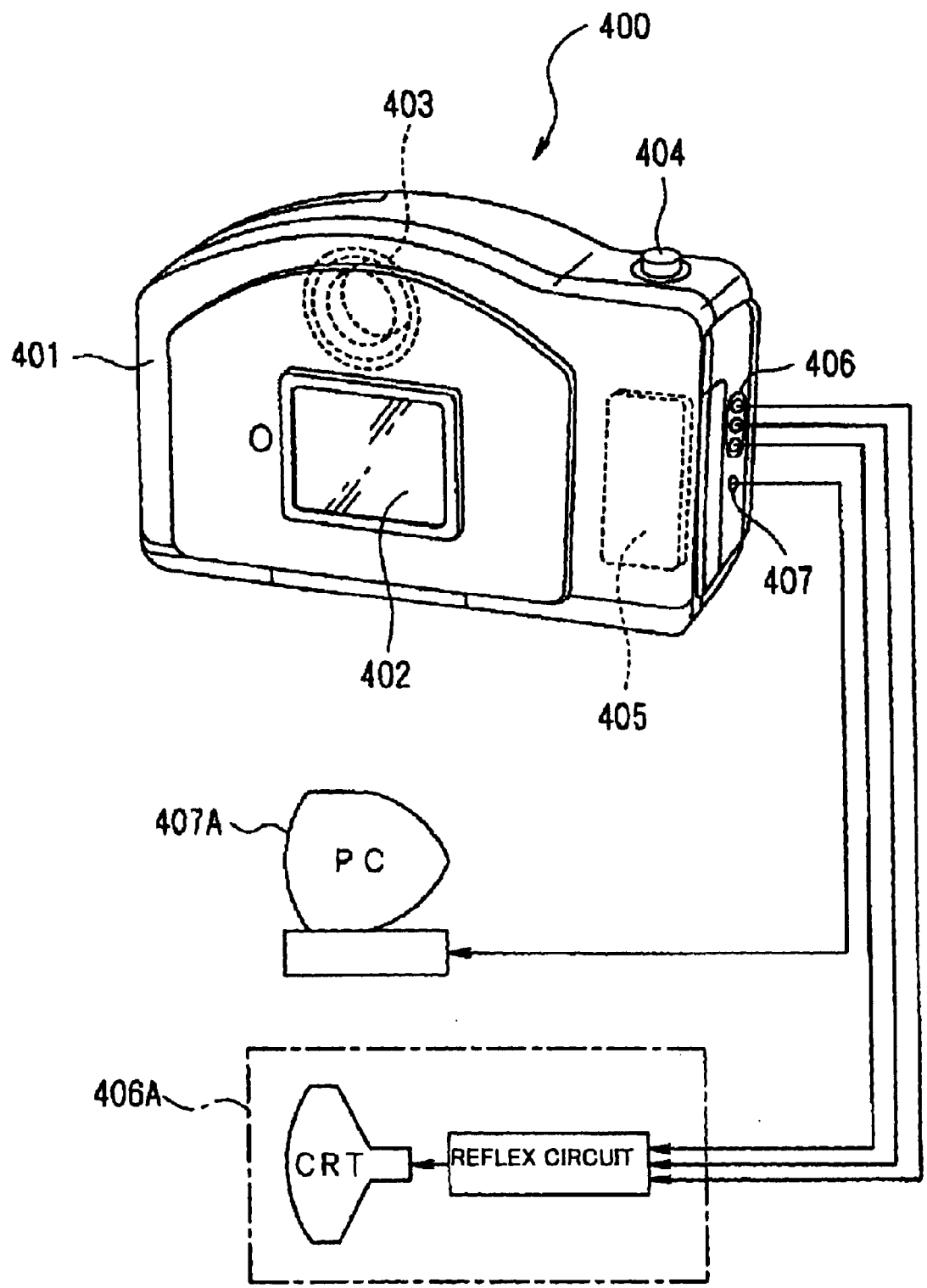

[Fig. 20]
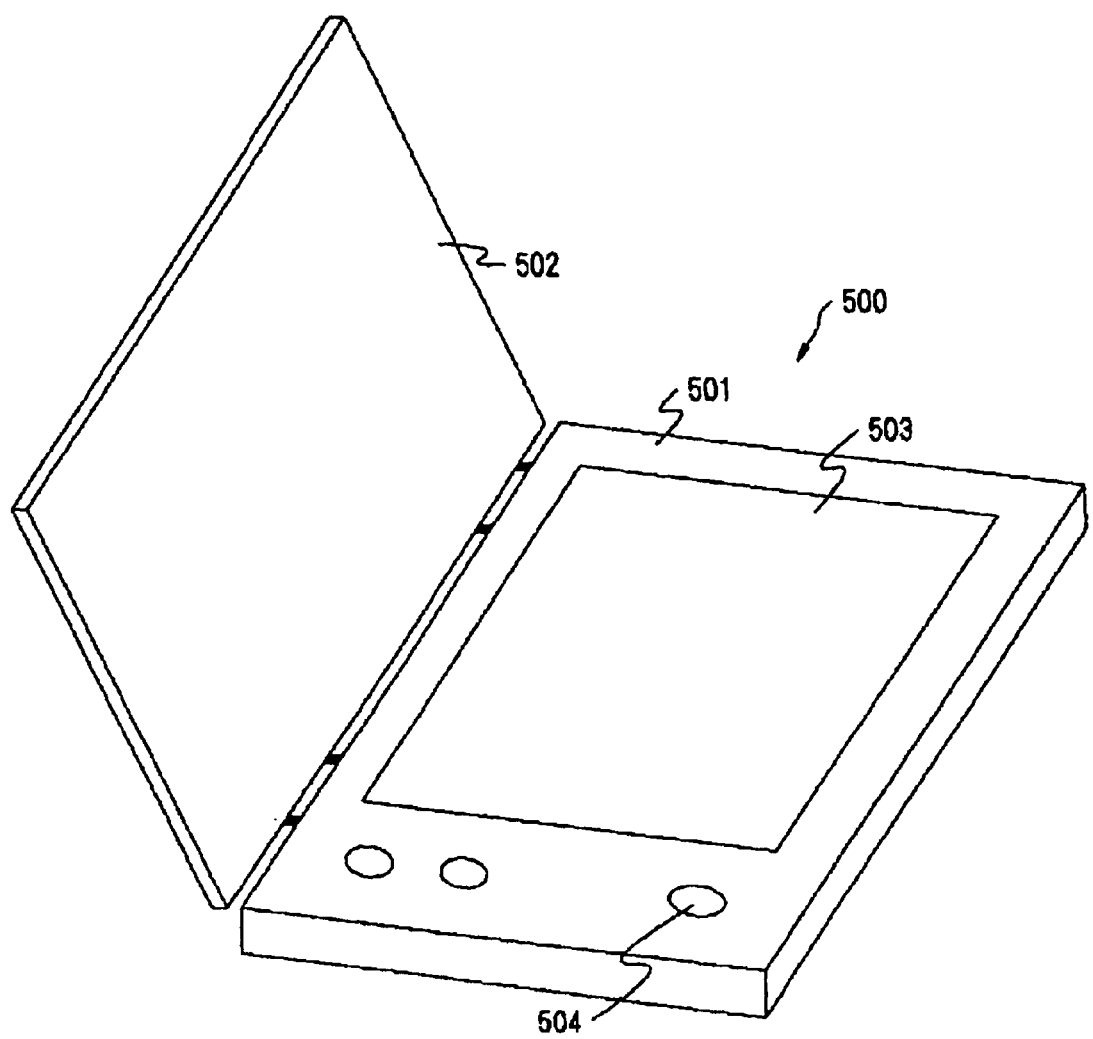

[Fig. 21]
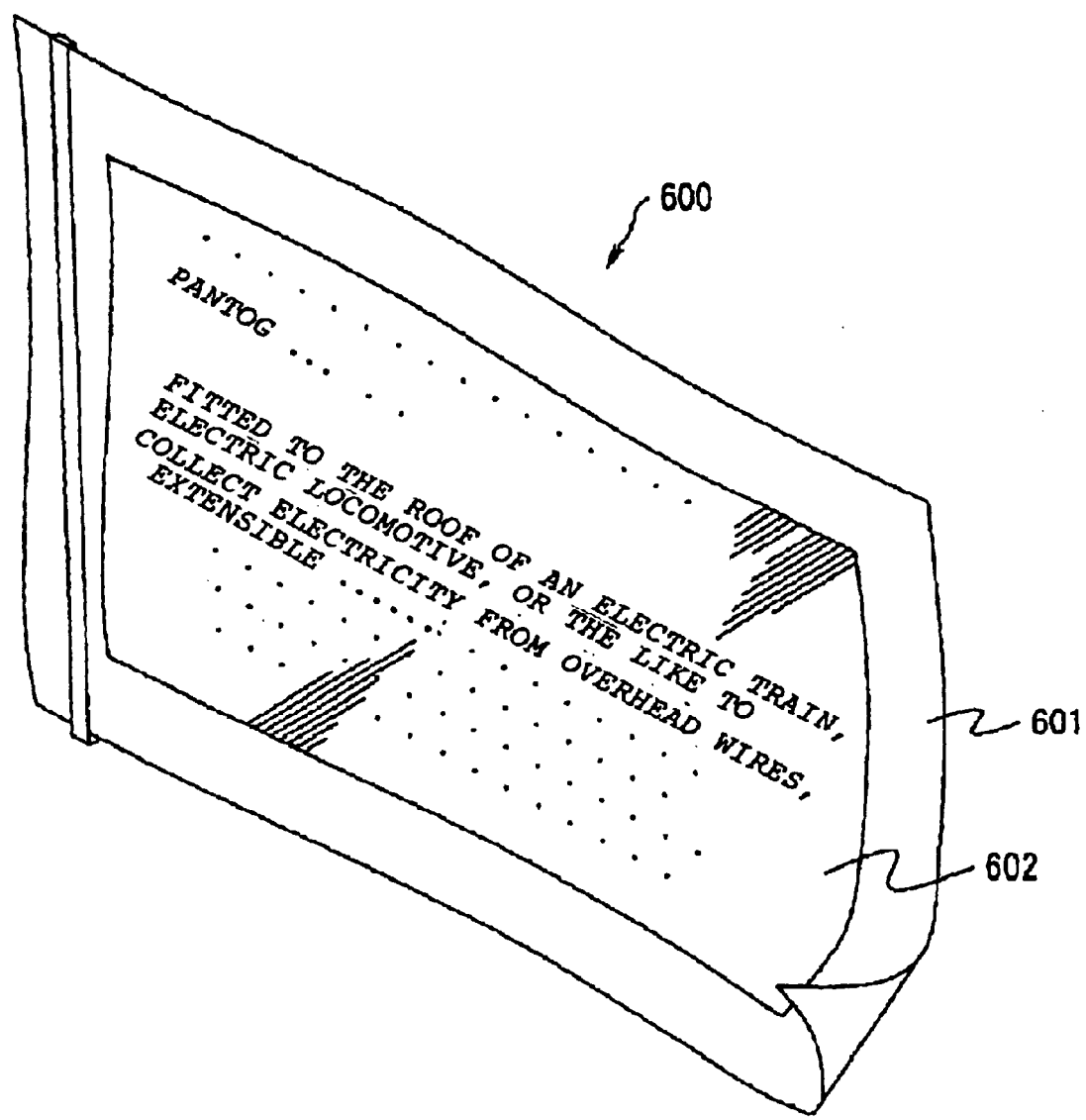

[Fig. 22]
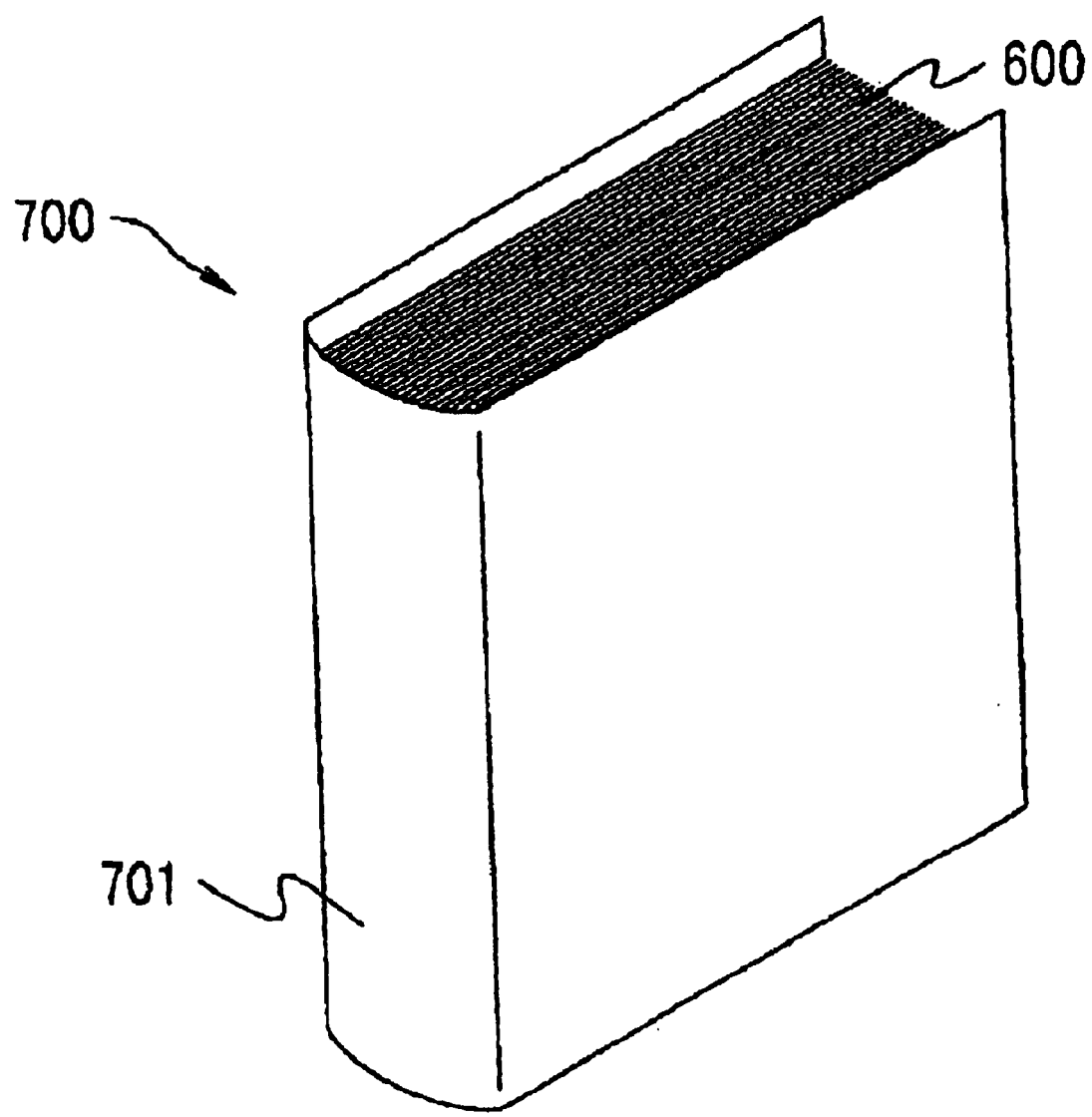

[Fig. 23]
(a)
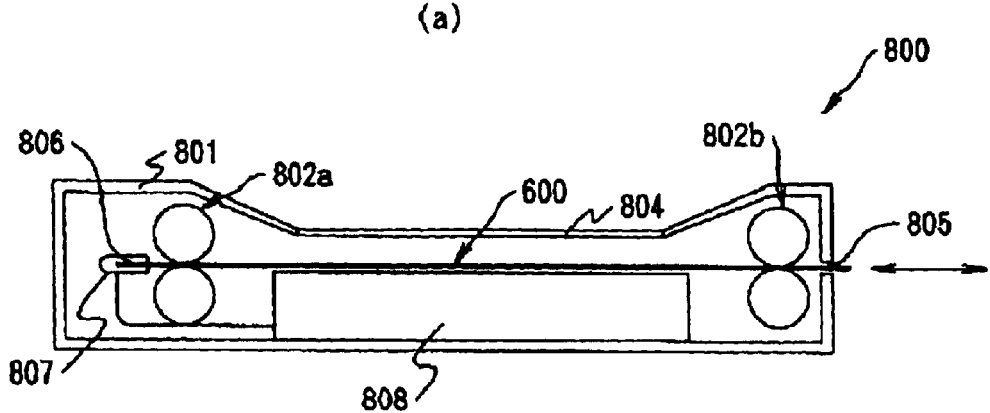
(b)
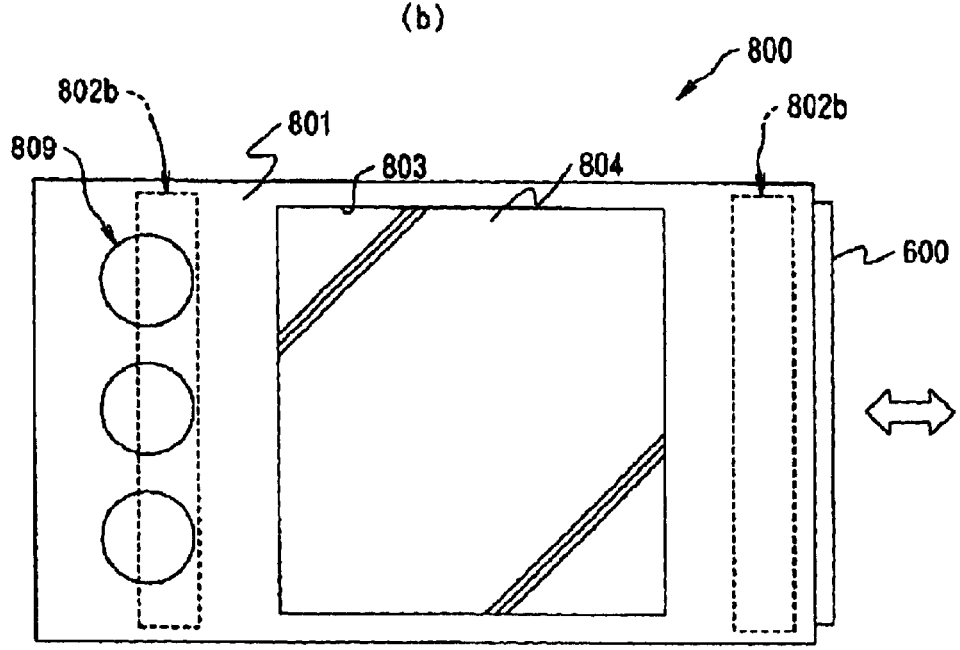

ELECTROPHORETIC DEVICE METHOD FOR MAKING ELECTROPHORETIC DEVICE, AND ELECTRONIC APPARATUS

BACKGROUND OF THE INVENTION

1. Technical Field of the Invention

The present invention relates to electrophoretic devices, methods for making electrophoretic devices, and electronic apparatuses.

2. Description of the Related Art

In a known electrophoretic device, an electrophoretic dispersion containing a liquid-phase dispersion medium and electrophoretic particles is enclosed between a pair of electrodes, at least one of the electrodes being transparent, and a voltage is applied between the electrodes to change the distribution state of the electrophoretic particles.

In the electrophoretic device, desired information can be displayed by controlling the amplitude, polarity, waveform, application time, frequency, etc., of the voltage applied between the electrodes. As an element for controlling the voltage applied between the electrodes, a transistor is generally used.

The electrophoretic device has display characteristics similar to printed matter because of its large viewing angle, high contrast, display memory capability, extremely low power consumption, etc.

Consequently, if the electrophoretic device is formed on a flexible substrate, it is considered to be possible to produce a display which is thin and soft like a sheet of paper and which is as easy to read as printed matter, i.e., electronic paper.

An example of the electrophoretic device is disclosed in Y. Chen et al., "SID 01 Digest", pp. 157–159, 2001. The electrophoretic device has a structure in which amorphous silicon thin-film transistors are formed on a stainless steel thin sheet with a protective layer therebetween, and a plurality of microcapsules encapsulating an electrophoretic dispersion are arrayed so as to be in contact with the thin-film transistors.

However, in such an electrophoretic device, it is difficult to fabricate the thin-film transistors on the stainless steel thin sheet which is used as the flexible substrate. In addition, since the microcapsules containing the electrophoretic dispersion are arrayed so as to be in contact with the thin-film transistors, the thin-film transistors are chemically degraded.

It is an object of the present invention to provide an electrophoretic device which is easy to fabricate and in which the transistor is prevented from being degraded, a method for fabricating the electrophoretic device, and an electronic apparatus including the electrophoretic device.

SUMMARY

The above object of the present invention is achieved by the constructions (1) to (43) of the present invention described below.

(1) An electrophoretic device includes a first substrate provided with an electrode; an electrophoretic dispersion layer containing an electrophoretic dispersion, the layer being disposed over a surface of the electrode remote from the first substrate; a transistor disposed on a surface of the first substrate remote from the electrophoretic dispersion layer, the transistor applying a voltage to the electrophoretic dispersion layer through the electrode; and a conducting part extending through the first substrate and electrically connecting the electrode and the transistor to each other.

(2) The electrophoretic device according to (1) further includes a counter electrode facing the electrode.

(3) In the electrophoretic device according to (2), the counter electrode is light transmissive.

(4) In the electrophoretic device according to either (2) or (3), the electrophoretic dispersion layer includes a portion interposed between the electrode and the counter electrode.

(5) The electrophoretic device according to any one of (2) to (4) further includes a counter substrate disposed on a surface of the counter electrode remote from the electrophoretic dispersion layer.

(6) In the electrophoretic device according to (5), the counter substrate is light transmissive.

(7) In the electrophoretic device according to any one of (1) to (6), the electrophoretic dispersion layer includes a plurality of capsules containing the electrophoretic dispersion.

(8) In the electrophoretic device according to any one of (1) to (7), the electrophoretic dispersion layer contains at least one type of electrophoretic particles.

(9) In the electrophoretic device according to any one of (1) to (7), the electrophoretic dispersion layer contains a plurality of types of electrophoretic particles having different properties.

(10) In the electrophoretic device according to (7), in the same capsule and/or different capsules, the electrophoretic dispersion contains a plurality of types of electrophoretic particles having different properties.

(11) In the electrophoretic device according to either (9) or (10), the properties include at least one of a charge property, electrophoretic mobility, and a color property.

(12) In the electrophoretic device according to any one of (1) to (11), the electrode is disposed in a recess formed in the surface of the first substrate.

(13) In the electrophoretic device according to any one of (1) to (12), the electrode and the transistor are disposed for each pixel.

(14) In the electrophoretic device according to (13), the number of electrodes and the number of transistors are the same.

(15) In the electrophoretic device according to (14), each electrode and the corresponding transistor are disposed on the first substrate at the positions offset from each other in the planar direction of the first substrate.

(16) The electrophoretic device according to either (14) or (15) further includes the same number of signal lines as that of the electrodes, and each transistor is connected between the corresponding electrode and the corresponding signal line so that a signal can be input into each electrode individually.

(17) The electrophoretic device according to either (14) or (15) further includes a plurality of signal lines and a plurality of scanning lines substantially orthogonal to the signal lines, and one of the electrodes and one of the transistors are disposed in the vicinity of each intersection between the signal lines and the scanning lines.

(18) In the electrophoretic device according to any one of (1) to (17), the first substrate has a multilayered structure.

(19) In the electrophoretic device according to (17), the first substrate has a multilayered structure, and each of the signal lines and each of the scanning lines are provided on different layers.

(20) In the electrophoretic device according to any one of (1) to (19), the first substrate is flexible.

(21) In the electrophoretic device according to any one of (1) to (20), the transistor is a thin-film transistor.

(22) In the electrophoretic device according to (21), the thin-film transistor is at least partially composed of an organic material.

(23) In the electrophoretic device according to either (21) or (22), the thin-film transistor is at least partially formed by an ink-jet process.

(24) In the electrophoretic device according to any one of (1) to (23), the transistor is in contact with the first substrate.

(25) In the electrophoretic device according to (24), the transistor is obtained by at least partially separating or detaching a semiconductor unit from a substrate that is different from the first substrate and then bonding to the surface of the first substrate.

(26) The electrophoretic device according to any one of (1) to (25) further includes a semiconductor unit which controls the transistor.

(27) In the electrophoretic device according to (26), the semiconductor unit is disposed on the same surface of the first substrate as that on which the transistor is disposed.

(28) In the electrophoretic device according to either (26) or (27), the semiconductor unit includes a shift register circuit for sending data, a latch circuit for storing data, and a voltage transducer circuit for amplifying data.

(29) A method for making an electrophoretic device includes a first step of forming an electrode on a first substrate, a second step of forming a conducting part so as to extend through the first substrate and come into contact with the electrode, a third step of forming a transistor so as to be in contact with the conducting part on the first substrate remote from the electrode, and a fourth step of forming an electrophoretic dispersion layer containing an electrophoretic dispersion on the electrode remote from the first substrate.

(30) In the method for making the electrophoretic device according to (29), in the first step, a recess is formed in the surface of the first substrate and the electrode is disposed in the recess.

(31) In the method for making the electrophoretic device according to either (29) or (30), in the third step, the transistor is formed so as to be in contact with the first substrate.

(32) In the method for making the electrophoretic device according to (31), in the third step, the transistor is obtained by at least partially separating or detaching a semiconductor unit from a substrate that is different from the first substrate and then bonding to the surface of the first substrate.

(33) In the method for making the electrophoretic device according to any one of (29) to (32), the transistor is a thin-film transistor.

(34) In the method for making the electrophoretic device according to (33), the thin-film transistor is at least partially composed of an organic material.

(35) In the method for making the electrophoretic device according to either (33) or (34), wherein the thin-film transistor is at least partially formed by an ink-jet process.

(36) In the method for making the electrophoretic device according to any one of (29) to (35), in the fourth step, the electrophoretic dispersion layer is at least partially interposed between the electrode and a counter electrode opposed thereto.

(37) In the method for making the electrophoretic device according to any one of (29) to (36), in the fourth step, the electrophoretic dispersion layer is formed by arraying a plurality of capsules containing the electrophoretic dispersion.

(38) The method for making the electrophoretic device according to any one of (29) to (37) further includes a step of forming a semiconductor unit which controls the transistor on the first substrate at the same side as that on which the transistor is disposed.

(39) In the method for making the electrophoretic device according to any one of (29) to (38), the first substrate has a multilayered structure.

(40) In the method for making the electrophoretic device according to any one of (29) to (39), the first substrate is flexible.

(41) In the method for making the electrophoretic device according to any one of (29) to (40), the electrode and the transistor are disposed for each pixel.

(42) In the method for making the electrophoretic device according to (41), the number of electrodes and the number of transistors are the same.

(43) An electronic apparatus includes the electrophoretic device according to any one of (1) to (28).

BRIEF DESCRIPTION OF THE DRAWINGS

FIG. 1 is a longitudinal sectional view of an electrophoretic device in a first embodiment of the present invention.

FIG. 2 is a longitudinal sectional view of an electrophoretic device in a second embodiment of the present invention.

FIG. 3 is a longitudinal sectional view of an electrophoretic device in a third embodiment of the present invention.

FIG. 4 is a longitudinal sectional view of an electrophoretic device in a fourth embodiment of the present invention.

FIG. 5 is a longitudinal sectional view of an electrophoretic device in a fifth embodiment of the present invention.

FIG. 6 is an equivalent circuit diagram of the electrophoretic device shown in FIG. 5.

FIG. 7 is a longitudinal sectional view of an electrophoretic device in a sixth embodiment of the present invention.

FIG. 8 is an equivalent circuit diagram showing an electrophoretic device in a seventh embodiment of the present invention.

FIG. 9 is an equivalent circuit diagram showing an electrophoretic device in an eighth embodiment of the present invention.

FIG. 10 is a longitudinal sectional view of an electrophoretic device in a ninth embodiment of the present invention.

FIG. 11 is an equivalent circuit diagram showing the electrophoretic device shown in FIG. 10.

FIG. 12 is a timing chart which shows the operation of the equivalent circuit shown in FIG. 11.

FIG. 13 is a longitudinal sectional view of an electrophoretic device in a tenth embodiment of the present invention.

FIGS. 14(a) to 14(c) are longitudinal sectional views which show the operation of the electrophoretic device shown in FIG. 13.

FIG. 15 a longitudinal sectional view of an electrophoretic device in an eleventh embodiment of the present invention.

FIGS. 16(a) to 16(c) are longitudinal sectional views which show the operation of the electrophoretic device shown in FIG. 15.

FIGS. 17(a) to 17(c) are longitudinal sectional views which show the operation of an electrophoretic device in a twelfth embodiment of the present invention.

FIG. 18 is a perspective view which shows an embodiment in which the electronic apparatus of the present invention is applied to a mobile phone.

FIG. 19 is a perspective view which shows an embodiment in which the electronic apparatus of the present invention is applied to a digital still camera.

FIG. 20 is a perspective view which shows an embodiment in which the electronic apparatus of the present invention is applied to an electronic book.

FIG. 21 is a perspective view which shows an embodiment in which the electronic apparatus of the present invention is applied to an electronic paper.

FIG. 22 is a perspective view which shows an embodiment in which the electronic apparatus of the present invention is applied to an electronic notebook.

FIG. 23 is a view which shows an embodiment in which the electronic apparatus of the present invention is applied to a display.

DETAILED DESCRIPTION

The preferred embodiments of the electrophoretic device, the method for making the electrophoretic device, and the electronic apparatus in accordance with the present invention will be described below.

First, electrophoretic devices of the present invention will be described.

First Embodiment

First, an electrophoretic device in a first embodiment of the present invention will be described.

FIG. 1 is a longitudinal sectional view of an electrophoretic device in the first embodiment of the present invention.

An electrophoretic device 20 shown in FIG. 1 includes a circuit board (first substrate) 1 having a plurality of pixel electrodes 3, a transparent substrate 2 having a transparent electrode 4 opposed to the individual pixel electrodes 3, and an electrophoretic dispersion layer 11. The constructions of the individual components will be described in sequence.

The circuit board 1 is a planar component and supports the individual components provided (formed) thereon, i.e., mainly, the pixel electrodes 3, the electrophoretic dispersion layer 11, and thin-film transistors 30.

The circuit board 1 may be flexible or rigid. Preferably, the circuit board 1 is flexible. By using the flexible circuit board 1, it is possible to obtain a flexible electrophoretic device 20, i.e., for example, an electrophoretic device 20 suitable for constructing electronic paper.

The circuit board 1 is composed of an insulating material. Examples of the insulating material used include polyimides, polyether etherketones, polyethylene naphthalate, polyether sulfones, polyethylene terephthalate, and polyethylene. These materials may be used alone or two or more of them may be combined.

The average thickness of the circuit board 1 is properly set depending on the material, application, etc., and is not particularly limited. When the circuit board 1 is flexible, the thickness is preferably approximately 20 to 500 $\mu$m, and more preferably approximately 25 to 200 $\mu$m. Consequently, the size of the electrophoretic device 20 can be reduced (particularly, the thickness of the electrophoretic device 20 can be decreased) while maintaining a harmonious balance between flexibility and strength of the electrophoretic device 20.

A plurality of electrodes as pixel electrodes 3 are disposed on a first surface (i.e., the upper surface in FIG. 1) of the circuit board 1.

Each pixel electrode 3, which functions as a first electrode for applying a voltage to the electrophoretic dispersion layer 11, is a film (layer).

The pixel electrode 3 is composed of, for example, aluminum, nickel, cobalt, platinum, gold, silver, copper, molybdenum, titanium, or tantalum. These materials may be used alone or two or more of them may be combined.

Although the average thickness of the pixel electrode 3 is properly set depending on the material, application, etc., and is not particularly limited, it is preferably approximately 0.05 to 10 $\mu$m, and more preferably approximately 0.05 to 5 $\mu$m.

A transparent electrode 4 is disposed on the underside (i.e., the lower surface in FIG. 1) of the transparent substrate 2 so as to face the pixel electrodes 3. That is, the transparent electrode 4 corresponds to a counter electrode facing the individual pixel electrodes 3. The transparent substrate 2 as a counter substrate which is opposed to the circuit board 1 is provided in contact with the transparent electrode 4 at the side opposite to the electrophoretic dispersion layer 11 side.

Each of the transparent substrate 2 and the transparent electrode 4 is light transmissive, and preferably, substantially transparent (transparent and colorless, transparent and colored, or translucent). Consequently, the state of the electrophoretic particles 5 in the electrophoretic dispersion layer 11, which will be described below, i.e., the desired information displayed on the electrophoretic device 20, is easily visible.

The transparent electrode 4, which functions as a second electrode for applying a voltage to the electrophoretic dispersion layer 11, is a film (layer).

Examples for the material for the transparent electrode 4 include conductive metal oxides, such as indium tin oxide (ITO), fluorinated tin oxide (FTO), indium oxide (IO), and tin oxide ($SnO_2$); conductive resins, such as polyacetylene; and conductive resins containing conductive metal fine particles. These materials may be used alone or two or more of them may be combined. Additionally, the pixel electrode 3 may be composed of such a material.

Although the average thickness of the transparent electrode 4 is properly set depending on the material, application, etc., and is not particularly limited, it is preferably approximately 0.05 to 10 $\mu$m, and more preferably approximately 0.05 to 5 $\mu$m.

The transparent substrate 2 supports the transparent electrode 4 and also functions as a protective layer for protecting the transparent electrode 4 (electrophoretic device 20).

The transparent substrate 2 is also preferably flexible. Examples of the material for the transparent substrate 2 include various types of resins, such as various cellulosic resins; polyester resins, e.g., polyethylene terephthalate (PET) and polyethylene naphthalate (PEN); polyethylene resins; polystyrene resins; polyvinyl chloride resins; polycarbonate (PC); polyether sulfones (PES); polyether etherketones (PEEK); and polyphenylene sulfide (PPS). These resins may be used alone or two or more of them may be combined.

Although the average thickness of the transparent substrate 2 is properly set depending on the material, application, etc., and is not particularly limited, it is preferably approximately 20 to 200 µm, and more preferably approximately 25 to 100 µm.

By setting the average thickness of each of the transparent substrate 2 and the transparent electrode 4 in the range described above, a harmonious balance between flexibility and strength of the electrophoretic device 20 can be maintained while maintaining visibility of the inside (electrophoretic dispersion layer 11).

A spacer 7 which defines the distance between each pixel electrode 3 and the transparent electrode 4 is disposed between the circuit board 1 and the transparent electrode 4 in the vicinity of the side of the electrophoretic device 20.

In this embodiment, the spacer 7 is disposed so as to surround the periphery of the electrophoretic device 20, and also functions as a sealing member which delimits an enclosed space 71 between the circuit board 1 and the transparent electrode 4.

Examples of the material for the spacer 7 include various resins, such as epoxy resins, acrylic resins, urethane resins, melamine resins, and phenolic resins; and various inorganic materials (ceramic materials), such as silica, alumina, and titania. These materials may be used alone or two or more of them may be combined.

Although the average thickness of the spacer 7, i.e., the electrode spacing, is not particularly limited, it is preferably approximately 10 µm to 5 mm, and more preferably approximately 20 µm to 1 mm.

Although the spacer 7 is disposed so as to surround the periphery of the electrophoretic device 20 (pixel electrodes 3), the spacer 7 may be disposed in any other manner. For example, a plurality of spacers 7 may be disposed with a spacing therebetween in the vicinity of the side of the electrophoretic device 20, and the spacing may be sealed with another sealing material (sealant).

The enclosed space 71 (inner space of the cell) contains (is filled with) an electrophoretic dispersion 10, and the electrophoretic dispersion layer 11 is thereby formed. That is, the electrophoretic dispersion layer 11 is disposed on the pixel electrodes 3 at the side opposite to the circuit board 1 side, and as shown in FIG. 1, the electrophoretic dispersion layer 11 includes portions that are interposed between the transparent electrode 4 and the individual pixel electrodes 3.

Examples of the electrophoretic dispersion 10 include a liquid in which electrophoretic particles 5 are dispersed (suspended) in a liquid-phase dispersion medium 6.

As the liquid-phase dispersion medium 6, a relatively highly insulative organic solvent may be used. Examples of the organic solvent include aromatic hydrocarbons, such as toluene, xylene, and alkylbenzenes; aliphatic hydrocarbons, such as pentane, hexane, and octane; alicyclic hydrocarbons, such as cyclohexane and methylcyclohexane; halogenated hydrocarbons, such as methylene chloride, chloroform, carbon tetrachloride, and 1,2-dichloroethane; various mineral oils and vegetable oils, such as silicone oil, fluorine-containing oil, and olive oil; and higher fatty acid esters. These substances may be used alone or in combination.

On the other hand, as the electrophoretic particles 5, organic or inorganic pigment particles, or a complex containing such particles may be used. Examples of the pigment include black pigments, such as aniline black and carbon black; white pigments, such as titanium dioxide, hydrozincite, and antimony trioxide; azo-pigments, such as monoazo pigments, disazo pigments, and polyazo pigments; yellow pigments, such as isoindolinone, chrome yellow, yellow iron oxide, cadmium yellow, titanium yellow, and antimony; red pigments, such as quinacridone red and chrome vermilion; blue pigments, such as phthalocyanine blue, indanthrene blue, anthraquinone dyes, Prussian blue, ultramarine blue, and cobalt blue; and green pigments, such as phthalocyanine green.

Additionally, as the electrophoretic particles 5, a mixture of two or more types of electrophoretic particles having different physical properties, such as a color property or electrophoretic mobility, may be used.

To the electrophoretic dispersion 10, as necessary, various additives, such as charge controlling agents comprising electrolytes, surfactants, metal soaps, resins, rubbers, oils, varnishes, particles composed of compounds, etc.; dispersants, e.g., titanium coupling agents, aluminum coupling agents, or silane coupling agents; lubricants; and stabilizing agents, may be added.

As necessary, dyes, such as anthraquinone dyes or azo-dyes, may also be dissolved in the electrophoretic dispersion 10 (liquid-phase dispersion medium 6).

Voltages are applied (supplied) to the electrophoretic dispersion layer 11 from the thin-film transistors 30 through the individual pixel electrodes 3.

In this embodiment, a portion in which the pixel electrode 3, the electrophoretic dispersion layer 11, and the transparent electrode 4 overlap constitutes a pixel.

The number of thin-film transistors 30 is the same as that of pixel electrodes 3.

That is, in this embodiment, one pixel electrode 3 and one thin-film transistor 30 are disposed for each pixel.

All of the thin-film transistors 30 are disposed on the circuit board 1 at the side opposite to the electrophoretic dispersion layer 11, and, in this embodiment, are disposed in contact with a second surface (i.e., the lower surface in FIG. 1) of the circuit board 1.

Additionally, as the transistor, instead of the thin-film transistor 30, various other types of transistor may be used. By using the thin-film transistor 30 as the transistor, the size of the electrophoretic device 20 can be reduced (particularly, the thickness of the electrophoretic device 20 can be decreased) and mass production of electrophoretic devices 20 is enabled.

The thin-film transistor 30 includes a gate region, a source region, and a drain region, and also includes a gate electrode, a source electrode, and a drain electrode corresponding to the respective regions, which are not shown in the drawing.

The individual regions are composed of semiconductor materials. Examples of the usable semiconductor materials include triphenyldiamine derivatives, such as N,N'-diphenyl-N,N'-bis(3-methylphenyl)-1,1'-biphenyl-4,4'-diamine, N,N'-diphenyl-N,N'-bis(4-methoxyphenyly-1,1'-biphenyl-4,4'-diamine, N,N,N',N'-tetrakis(4-methoxyphenyly-1,1'-biphenyl-4,4'-diamine, N,N,N', N'tetraphenyl-4,4'-diaminophenyl, and N,N,N',N'-tetra(p-tolyl)-4,4'-diaminophenyl; carbazole derivatives, such as N-isopropylcarbazole and N-phenylcarbazole; amine compounds, such as N,N,N-tri(p-tolyl)amine; pyrazoline compounds; hydrazone compounds; oxadiazole compounds; aromatic amine derivatives, such as phthalocyanine compounds, or polymers containing these compounds;

organic semiconductor materials, such as tetracene, pentacene, fullerene, perilene, coronene, rubrene, anthradithiophene, and oligothiophene. In addition, a various types of inorganic semiconductor materials can be used.

Each of the electrodes is composed of a conductive material. Examples of the conductive material include organic conductive materials, such as polyacetylene, polyaniline, and polyethylene dioxythiophene (PEDOT); and conductive metal materials (inorganic conductive materials) such as metals like aluminum, nickel, cobalt, platinum, gold, silver, copper, molybdenum, titanium, and tantalum, or alloys containing these metals.

By using the organic materials, such as the organic semiconductor materials or organic conductive materials described above, for the thin-film transistors 30, the thin-film transistors 30 can be fabricated more easily and at lower cost.

If such organic materials are used, the thin-film transistors 30 may be formed by an ink-jet process. In such an ink-jet process, the thin-film transistors 30 can be formed easily and with high accuracy.

A plurality of through-holes 80 extending in the thickness direction are formed at the predetermined positions of the circuit board 1. Each through-hole 80 is provided with a conductive part 8 which electrically connect the thin-film transistor 30 and the pixel electrode 3 that corresponds to the thin-film transistor 30 to each other.

The conductive part 8 may be composed of the same material as that for the pixel electrode 3 described above.

In the electrophoretic device 20 having the construction described above, since the thin-film transistors 30 and the electrophoretic dispersion layer 11 are separated from each other by the circuit board 1, the thin-film transistors 30 can be prevented from being degraded (chemically degraded).

In the electrophoretic device 20 with such a construction, the circuit board 1, the spacer 7, the transparent electrode 4, and the transparent substrate 2 constitute one cell.

In the electrophoretic device 20, the electrophoretic particles 5 having one color and the liquid-phase dispersion medium 6 having another color may be combined. Specifically, for example, when the electrophoretic particles 5 are white and the liquid-phase dispersion medium 6 is blue, red, green, or black, by causing the migration of the electrophoretic particles 5 as will be described below, the color of the electrophoretic particles 5, the color of the liquid-phase dispersion medium 6, or a mixture of these colors may be displayed properly in the electrophoretic device 20.

A case in which negatively charged electrophoretic particles 5 are used will be described below.

When an external electric field is applied to the electrophoretic dispersion layer 11, the electrophoretic particles 5 migrate in a direction opposite to the direction of the electric field.

For example, when the thin-film transistor 30 applies a voltage so that the pixel electrode 3 has a negative potential and the transparent electrode 4 has a zero potential, an electric field is generated from the transparent electrode 4 to the pixel electrode 3. As a result, the electrophoretic particles 5 migrate toward and gather around the transparent electrode 4 in the electrophoretic dispersion layer 11. Consequently, the color viewed from the transparent substrate 2 side turns out to be the color of the electrophoretic particles 5, and if the electrophoretic particles 5 are white, a white display is performed.

On the other hand, when the thin-film transistor 30 applies a voltage such that the pixel electrode 3 has a positive potential and the transparent electrode 4 has a zero potential, an electric field is generated from the pixel electrode 3 to the transparent electrode 4. As a result, the electrophoretic particles 5 migrate toward and gather around the pixel electrode 3 in the electrophoretic dispersion layer 11. Consequently, the color viewed from the transparent substrate 2 side turns out to be the color of the liquid-phase dispersion medium 6, and if the liquid-phase dispersion medium 6 is blue, a blue display is performed.

Therefore, by setting the color of the liquid-phase dispersion medium 6 and controlling the applied voltage for each pixel, desired information can be displayed in black and white or in color on the electrophoretic device 20.

In the electrophoretic device 20, by setting the specific gravity of the electrophoretic particles 5 to be substantially the same as that of the liquid-phase dispersion medium 6, the electrophoretic particles 5 are allowed to remain at the predetermined position in the electrophoretic dispersion layer 11 for a long period even after the external electric field applied to the electrophoretic dispersion layer 11 is stopped. That is, the information displayed on the electrophoretic device 20 is retained for a long period.

An example of a method for fabricating the electrophoretic device 20 will be described below.

The electrophoretic device 20 may be fabricated as follows.

[1] First, on a first surface (the upper surface in FIG. 1) of a circuit board 1, pixel electrodes 3 are formed in a predetermined pattern, for example, by etching a thin film deposited in the vapor phase or in the liquid phase (first step).

[2] Next, at predetermined positions of the circuit board 1, a plurality of through-holes 80, each extending from a second surface (the lower surface in FIG. 1) of the circuit board 1 to each pixel electrode 3, are formed by melting the circuit board 1 using a process, such as wet etching, dry etching, or laser irradiation. A conducting part 8 is provided in each through-hole 80 (second step).

[3] A thin-film transistor 30 is disposed on the second surface of the circuit board 1 so as to be in contact with each conducting part 8 (third step).

For example, this step may be performed by any one of the following processes I to III.

I: For example, when the thin-film transistor 30 is composed of an organic material, such as an organic conductive material or an organic semiconductor material, the thin-film transistor 30 can be formed directly on the circuit board 1 by an ink-jet process.

In such a case, all of the drain electrode, source electrode, gate electrode, and individual regions (semiconductor material layers) of the thin-film transistor 30 may be formed using the organic material. Alternatively, any one of the drain electrode, source electrode, and gate electrode may be preliminarily formed on the circuit board 1, and the remaining electrodes and individual regions (semiconductor material layers) may be formed by a given process, such as an ink-jet process.

II: A semiconductor unit is formed on a substrate that is different from the circuit board 1, and the semiconductor unit is then at least partially detached from the substrate and is bonded to the second surface of the circuit board 1. The thin-film transistor 30 is thereby formed.

III: A semiconductor unit is formed on a substrate that is different from the circuit board 1, and the semiconductor unit is then at least partially separated from the substrate and is fitted into a recess formed in the second surface of the circuit board 1. The thin-film transistor 30 is thereby formed.

Additionally, the three processes I to III may be combined for use.

[4] Next, a transparent substrate 2 provided with a transparent electrode 4 at a first surface (the lower surface in FIG. 1) and the circuit board 1 are placed so that the transparent electrode 4 and the individual pixel electrodes 3 face each other, and a material for a spacer 7 is supplied in the vicinity of the side, followed by setting (hardening) to form the spacer 7. As a result, an enclosed space 71 is formed in a portion surrounded by the circuit board 1, the transparent electrode 4, and the spacer 7.

Additionally, an opening is formed in the spacer 7 so that an electrophoretic dispersion 10 is supplied to the enclosed space 71.

The electrophoretic dispersion 10 is supplied to the enclosed space 71 through the opening, and the opening is then sealed with a sealant. As a result, an electrophoretic dispersion layer 11 is formed over the pixel electrodes 3 at the side opposite to the circuit board 1 side (fourth step). The electrophoretic dispersion layer 11 is partially interposed between the transparent electrode 4 and the individual pixel electrodes 3 in this state.

The electrophoretic device 20 is fabricated by the steps described above.

In accordance with the fabrication method of the electrophoretic device 20, since the individual components of the electrophoretic device 20 are not bonded under mechanical stress, the individual components are prevented from being degraded or damaged.

Second Embodiment

Next, an electrophoretic device in a second embodiment of the present invention will be described.

FIG. 2 is a longitudinal sectional view of the electrophoretic device in the second embodiment of the present invention.

The differences between the electrophoretic device in the second embodiment and the electrophoretic device in the first embodiment will be mainly described, and a description of the similarities will be omitted.

An electrophoretic device 20 in the second embodiment is the same as the electrophoretic device in the first embodiment except that the electrophoretic dispersion layer 11 has a different construction.

That is, a plurality of microcapsules 40 in which an electrophoretic dispersion 10 is encapsulated are arrayed in an electrophoretic dispersion layer 11 of the electrophoretic device 20 in the second embodiment.

As shown in FIG. 2, the microcapsules 40 are partially supported by the pixel electrodes 3 and the transparent electrode 4. That is, the electrophoretic dispersion layer 11 includes portions interposed between the transparent electrode 4 and the individual pixel electrodes 3.

By encapsulating the electrophoretic dispersion 10 in microcapsules, handling is facilitated and the fabrication process is simplified.

In the resultant electrophoretic device 20, it is possible to prevent display nonuniformity due to uneven distribution of the electrophoretic particles 5. It is also possible to easily dispose the electrophoretic dispersion layer 11 on the flexible circuit board 1.

The microcapsule 40 includes a capsule body 41 and the electrophoretic dispersion 10 encapsulated in the capsule body 41.

Examples of the material for the capsule body 41 include various resin materials, such as gelatin, polyurethane resins, polyurea resins, urea resins, melamine resins, acrylic resins, polyester resins, and polyamide resins. These resins may be used alone or two or more of them may be combined.

In order to form the microcapsule 40, various methods may be used. For example, interfacial polymerization method, in-situ polymerization method, a phase separation method, an interfacial precipitation method, or spray drying method may be used.

Preferably, the microcapsules 40 have substantially the same size. Consequently, the electrophoretic device 20 performs a superior display function.

In order to achieve size uniformity of the microcapsules 40, for example, filtration, screening, or gravity separation may be performed.

Although the size (average particle size) of the microcapsules 40 is not particularly limited, it is preferably approximately 10 to 150 µm, and more preferably approximately 30 to 100 µm.

In this embodiment, a binder 42 is supplied between the circuit board 1 and the transparent electrode 4 and in the periphery of the microcapsules 40, and the individual microcapsules 40 are thereby fixed. That is, in this embodiment, the binder 42 is considered to be a component of the electrophoretic dispersion layer 11.

As the binder 42, any material may be used as long as it has a high affinity for and exhibits excellent adhesion to the capsule body 41 of the microcapsule 40 and also it is insulative.

Examples of the binder 42 include various resin materials, such as thermoplastic resins like polyethylene, chlorinated polyethylene, ethylene-vinyl acetate copolymers, ethylene-ethyl acrylate copolymers, polypropylene, ABS resins, methyl methacrylate resins, vinyl chloride resins, polyvinyl chloride acetate copolymers, vinyl chloride-vinylidene chloride copolymers, vinyl chloride-acrylic ester copolymers, vinyl chloride-methacrylate copolymers, vinyl chloride-acrylonitrile copolymers, ethylene-vinyl alcohol-vinyl chloride copolymers, propylene-vinyl chloride copolymers, vinylidene chloride resins, vinyl acetate resins, polyvinyl alcohols, polyvinyl formal, and cellulosic resins; polymers like polyamide resins, polyacetals, polycarbonate, polyethylene terephthalate, polybutylene terephthalate, polyphenylene oxide, polysulfones, polyamide-imides, polyaminobismaleimides, polyether sulfones, polyphenylene sulfones, polyacrylates, graft polyphenylene ethers, polyether etherketones, and polyether imides; fluoroplastics like polytetrafluoroethylene, fluorinated polyethylene-propylene, tetrafluoroethylene-perfluoroalkoxyethylene copolymers, ethylenetetrafluoroe-thylene copolymers, polyvinylidene fluoride, polychlorotrifluoroethylene, and fluororubber; silicon resins such as silicon rubber; and others like methacrylate-styrene copolymers, polybutylene, and methyl methacrylate-butadiene-styrene copolymers. These materials may be used alone or two or more of them may be combined.

Preferably, the dielectric constant of the binder 42 is substantially the same as that of the liquid-phase dispersion medium 6. In order to control the dielectric constant, preferably, an additive, e.g., an alcohol, such as 1,2-butanediol or 1,4-butanediol, a ketone, or a carboxylate, is used.

In order to form the electrrophoretic dispersion liquid layer 11, in step [4], a resin composition (emulsion or organic solvent solution) prepared by mixing the microcapsules 40 and, as necessary, the additive for controlling the dielectric constant into the binder 42 is applied onto the circuit board 1, for example, by a roll coater process, a roll laminator process, a screen-printing process, a spraying process, or an ink-jet process to form a coated film, and the transparent substrate 2 is then disposed so that the coated film and the transparent electrode 4 are in contact with each other.

Alternatively, the resin composition may be applied onto the transparent electrode 4 by the coating method to form a coated film, and the circuit board 1 may be then disposed so that the coated film and the individual pixel electrodes 3 are in contact with each other.

Additionally, as necessary, it may be possible to omit supplying the binder 42 in the periphery of the microcapsules 40.

In the electrophoretic device 20 in the second embodiment, the same advantages as those in the first embodiment are also obtained.

The construction of the electrophoretic dispersion layer 11 in this embodiment is also applicable to the electrophoretic dispersion layer 11 in the first embodiment and electrophoretic dispersion layers 11 in fourth to ninth embodiments which will be described later.

Third Embodiment

Next, an electrophoretic device in a third embodiment of the present invention will be described.

FIG. 3 is a longitudinal sectional view of the electrophoretic device in the third embodiment of the present invention.

The differences between the electrophoretic device in the third embodiment and the electrophoretic devices in the first and second embodiments will be mainly described below, and a description of the similarities will be omitted.

An electrophoretic device 20 in the third embodiment is the same as the electrophoretic device in the second embodiment except that the position in which the pixel electrode 3 is disposed is different.

That is, in the electrophoretic device 20 in the third embodiment, each pixel electrode 3 is disposed in a recess 100 formed in a first surface (the upper surface in FIG. 3) of the circuit board 1.

By employing such a construction, the surface of the circuit board 1 with which the elctrophoretic dispersion liquid layer 11 is in contact becomes even. In particular, when the electophoretic dispersion liquid layer 11 is composed of a plurality of microcapsules 40 as in this embodiment, the microcapsules 40 can be advantageously prevented from being deformed or damaged by the edges of the pixel electrodes 3.

In order to form the pixel electrodes 3 in such a state, in step (1), recesses 100 are formed at predetermined positions of a first surface (the upper surface in FIG. 3) of the circuit substrate 1, for example, by melting with laser irradiation, etching, or embossing, and the pixel electrodes 3 may be disposed in the recesses 100, for example, in the same manner as in step [1], or the pixel electrodes 3 which have been preliminarily formed in a predetermined shape are fitted into the recesses 100.

In the electrophoretic device 20 in the third embodiment, the same advantages as those in the first and second embodiments are also obtained.

Fourth Embodiment

An electrophoretic device in a fourth embodiment of the present invention will now be described below.

FIG. 4 is a longitudinal sectional view of the electrophoretic device in the fourth embodiment of the present invention.

The differences between the electrophoretic device in the fourth embodiment and the electrophoretic device in the first embodiment will be mainly described, and a description of the similarities will be omitted.

An electrophoretic device 20 in the fourth embodiment is the same as the electrophoretic device in the first embodiment except that the position in which the thin-film transistor 30 is disposed is different.

That is, in the electrophoretic device 20 in the fourth embodiment, the thin-film transistor 30 and the pixel electrode 3 which are associated with each other are disposed on the circuit board 1 at the positions offset from each other in the planar direction of the circuit board 1.

Such a construction increases freedom of design in the electrophoretic device 20.

In this embodiment, in step [3], a conducting part 8 is extended and an interconnecting pattern 32 is formed on the second surface (the lower surface in FIG. 4) of the circuit board 1, and each thin-film transistor 30 is then disposed in contact with the interconnecting pattern 32 at a predetermined position.

In the electrophoretic device 20 in the fourth embodiment, the same advantages as those in the first embodiment are also obtained.

Fifth Embodiment

An electrophoretic device in a fifth embodiment of the present invention will now be described below.

FIG. 5 is a longitudinal sectional view of the electrophoretic device in the fifth embodiment of the present invention, and FIG. 6 is an equivalent circuit diagram of the electrophoretic device shown in FIG. 5.

The differences between the electrophoretic device in the fifth embodiment and the electrophoretic device in the first embodiment will be mainly described, and a description of the similarities will be omitted.

An electrophoretic device 20 in the fifth embodiment is the same as the electrophoretic device in the first embodiment except that a circuit board 1 has a multilayered structure and beside pixel electrodes 3 and thin-film transistors 30, a plurality of signal lines 9a and a plurality of scanning lines 9b are provided on the circuit board 1.

As shown in FIG. 6, the individual signal lines 9a and the individual scanning lines 9b are substantially orthogonal to each other, and in the vicinity of each intersection of the signal lines 9a and the scanning lines 9b, a pixel electrode 3 and a thin-film transistor 30 are arrayed, thus forming a so-called active matrix structure.

Specifically, each signal line 9a is electrically connected to the source electrode of a predetermined thin-film transistor 30, and each scanning line 9b is electrically connected to the gate electrode of a predetermined thin-film transistor 30. The drain electrode of each thin-film transistor 30 is electrically connected its corresponding pixel electrode 3.

By employing such a construction, it is possible to form a fine pattern of the pixel electrode 3, and a voltage can be applied (supplied) to each pixel electrode 3 efficiently. As a result, an electrophoretic device 20 which can display more multicolored images is obtained.

The circuit board 1 having a multilayered structure may include many insulating films and wiring layers.

In this embodiment, a plurality of signal lines 9a are provided substantially in the center (intermediate layer) in the thickness direction of the circuit board 1, and each signal line 9a is electrically connected to its corresponding thin-film transistor 30 by a conductive part 8b for the signal line formed in the circuit board 1.

The scanning line 9b is formed on the same layer as that on which the thin-film transistor 30 is formed, i.e., on a second surface (the lower surface in FIG. 5) of the circuit board 1.

By forming the signal line 9a and the scanning line 9b on the different layers, the pixel electrodes 3 can be arrayed more densely, and an electrophoretic device 20 which can perform a high-definition display is obtained.

Additionally, the positions for placing (forming) the signal lines 9a and the positions for placing (forming) the scanning lines 9b may be reversed compared to the construction shown in the drawing.

In the electrophoretic device 20 in the fifth embodiment, the same advantages as those in the first embodiment are also obtained.

Sixth Embodiment

Next, an electrophoretic device in a sixth embodiment of the present invention will be described below.

FIG. 7 is a longitudinal sectional view of the electrophoretic device in the sixth embodiment of the present invention.

The differences between the electrophoretic device in the sixth embodiment and the electrophoretic devices in the first and fifth embodiments will be mainly described, and a description of the similarities will be omitted.

An electrophoretic device 20 in the sixth embodiment is the same as the electrophoretic device in the fifth embodiment except that the position for placing (forming) each signal line 9a is different.

That is, in the electrophoretic device 20 in the sixth embodiment, the signal lines 9a are formed on the same layer as that on which the pixel electrodes 3 are formed, i.e., on a first surface (the upper surface in FIG. 7) of the circuit board 1.

By employing such a construction, in step [1], the pixel electrodes 3 and the signal lines 9a are formed. Consequently, the number of fabrication steps is decreased and an electrophoretic device 20 which can perform a high-definition display is obtained.

In this embodiment, the positions for placing (forming) the signal lines 9a and the positions for placing (forming) the scanning lines 9b may also be reversed compared to the construction shown in the drawing.

In the electrophoretic device 20 in the sixth embodiment, the same advantages as those in the first and fifth embodiments are also obtained.

Seventh Embodiment

Next, an electrophoretic device in a seventh embodiment of the present invention will be described below.

FIG. 8 is an equivalent circuit diagram of the electrophoretic device in the seventh embodiment of the present invention.

The differences between the electrophoretic device in the seventh embodiment and the electrophoretic devices in the first and fifth embodiments will be mainly described, and a description of the similarities will be omitted.

An electrophoretic device 20 in the seventh embodiment is the same as the electrophoretic device in the fifth embodiment except that the constructions (connecting configurations) of the signal lines 9a and the scanning lines 9b are different.

That is, in the electrophorectic device 20 in the seventh embodiment, the number of the signal lines 9a and the number of the pixel electrodes 3 are the same, the number of thin-film transistors 30 and the number of the pixel electrodes 3 are the same, and each thin-film transistor 30 is connected between its corresponding signal line 9a and its corresponding pixel electrode 3.

Specifically, each signal line 9a is electrically connected to the source electrode of each thin-film transistor 30 and one scanning line 9b is electrically connected to the gate electrodes of all the thin-film transistors 30.

Consequently, each thin-film transistor 30 can apply (supply) a voltage to each pixel electrode 3 individually.

That is, the electrophoretic device 20 in the seventh embodiment is a so-called "direct driving type" device.

In this embodiment, the scanning line 9b is shared by all the thin-film transistors 30.

By employing such a construction, since it is not necessary to array the transistors in a matrix, in particular, when the number of pixel electrodes 3 is relatively small, the transistors can be arrayed in an integrated manner, thus improving freedom of construction in the electrophoretic device 20.

In this embodiment, as in the fifth embodiment, the circuit board 1 may have a multilayered structure and the pixel electrode 3, the signal line 9a, the scanning line 9b, and the thin-film transistor 30 may be formed on different layers, or as long as the thin-film transistors 30 are not in contact with the electrophoretic dispersion layer 11, they may be formed on any layer in any combination.

In the electrophoretic device 20 in the seventh embodiment, the same advantages as those in the first and fifth embodiments are also obtained.

Eighth Embodiment

Next, an electrophoretic device in an eighth embodiment of the present invention will be described below.

FIG. 9 is an equivalent circuit diagram showing the electrophoretic device in the eighth embodiment of the present invention.

The differences between the electrophoretic device in the eighth embodiment and the electrophoretic devices in the first and seventh embodiments will be mainly described, and a description of the similarities will be omitted.

An electrophoretic device 20 in the eighth embodiment is the same as the electrophoretic device in the seventh embodiment except that each scanning line 9b is connected to the gate electrode of each thin-film transistor 30 individually.

By employing such a construction, the individual thin-film transistors 30 can be controlled in different timings.

In this embodiment, as in the fifth embodiment, the circuit board 1 may have a multilayered structure and the pixel electrode 3, the signal line 9a, the scanning line 9b, and the thin-film transistor 30 may be formed on different layers, or as long as the thin-film transistors 30 are not in contact with the electrophoretic dispersion layer 11, they may be formed on any layer in any combination.

In the electrophoretic device 20 in the eighth embodiment, the same advantages as those in the first and seventh embodiments are also obtained.

Ninth Embodiment

Next, an electrophoretic device in a ninth embodiment will be described below.

FIG. 10 is a longitudinal sectional view which shows the electrophoretic device in the ninth embodiment, FIG. 11 is an equivalent circuit diagram showing the electrophoretic device shown in FIG. 10, and FIG. 12 is a timing chart which shows the operation of the equivalent circuit shown in FIG. 11.

The differences between the electrophoretic device in the ninth embodiment and the electrophoretic devices in the first and seventh embodiments will be mainly described, and a description of the similarities will be omitted.

An electrophoretic device 20 in the ninth embodiment is the same as the electrophoretic device in the seventh embodiment except that a semiconductor unit 31 for controlling each thin-film transistor 30 is included.

In this embodiment, the semiconductor unit 31 is disposed on a second surface (the lower surface in FIG. 10) of the circuit board 1, i.e., on the same surface as that on which the thin-film transistor 30 is disposed at the side opposite to the electrophoretic dispersion layer 11 side of the circuit board 1. Consequently, the semiconductor unit 31 can be prevented from being degraded (chemically degraded).

As shown in FIG. 11, the semiconductor unit 31 includes a shift register circuit 31a for sending data, a latch circuit (memory circuit) 31b for storing data, a voltage transducer circuit (amplification circuit) 31c for amplifying data, and a scanning line control circuit 31d for controlling the voltage applied to the gate region of the thin-film transistor 30.

Additionally, the semiconductor unit 31 may include a decoder circuit for selecting the thin-film transistors 30.

By providing such a semiconductor unit 31 on the electrophoretic device 20, for example, when the electrophoretic device 20 is built in a mobile terminal or the like, reduction in size is enabled.

In this embodiment, a step of placing (forming) the semiconductor unit 31 may be included, for example, between step [2] and step or between step [3] and step [4].

The electrophoretic device 20 is controlled, for example, as shown in FIG. 12.

I: First, data serially input are converted into parallel data while being synchronized with a clock and transmitted by the shift register circuit 31a(indicated by symbol A in FIG. 12). When a predetermined number of signals is transmitted (indicated by symbol 8 in FIG. 12), the parallel data is stored in the latch circuit 31b by a latch signal, and the data is output to the signal line through the voltage transducer circuit 31c.

II: Next, the scanning line 9b is controlled by the scanning line control circuit 31d according to the timing of data output to the signal line 9a to turn on the thin-film transistor 30, and the data is thereby input (supplied) to the pixel electrode 3. That is, a predetermined voltage is applied to the electrophoretic dispersion layer 11.

III: Next, after the voltage is applied to the electrophoretic dispersion layer 11 for a predetermined period, the scanning line 9b is controlled again by the scanning line control circuit 31d to turn off the thin-film transistor 30. At this stage, as necessary, the latch may be cleared to reset the output data of the signal line 9a.

In the electrophoretic device 20 in the ninth embodiment, the same advantages as those in the first and seventh embodiments are also obtained.

Tenth Embodiment

Next, an electrophoretic device in a tenth embodiment will be described.

FIG. 13 is a longitudinal sectional view of the electrophoretic device in the tenth embodiment of the present invention, and FIGS. 14(a) to 14(c) are longitudinal sectional views which show the operation of the electrophoretic device shown in FIG. 13.

The differences between the electrophoretic device in the tenth embodiment and the electrophoretic device in the first embodiment will be mainly described, and a description of the similarities will be omitted.

An electrophoretic device 20 in the tenth embodiment is the same as the electrophoretic device in the first embodiment except that the construction of the electrophoretic dispersion 10 is different.

That is, in the electrophoretic dispersion 10 in the tenth embodiment, a plurality of types of electrophoretic particles having different properties, specifically, two types of electrophoretic particles 5a and 5b having different charges, are dispersed in the liquid-phase dispersion medium 6.

In this embodiment, a case in which the electrophoretic particles 5a are negatively charged and white and the electrophoretic particles 5b are positively charged and black (colored) will be described.

In the electrophoretic device 20, when the thin-film transistor 30 applies a voltage so that the pixel electrode 3 has a negative potential and the transparent electrode 4 has a zero potential, an electric field is generated from the transparent electrode 4 to each pixel electrode 3. As a result, as shown in FIG. 14(a), in the electrophoretic dispersion layer 11, the electrophoretic particles 5a migrate toward and gather around the transparent electrode 4. On the other hand, the electrophoretic particles 5b migrate toward and gather around the pixel electrodes 3. Consequently, in this case, the color viewed from the transparent substrate 2 side turns out to be the color of the electrophoretic particles 5a, i.e., white.

On the other hand, when the thin-film transistor 30 applies a voltage so that the pixel electrode 3 has a positive potential and the transparent electrode 4 has a zero potential, the electrophoretic particles 5a and the electrophoretic particles 5b migrate in directions opposite to those described above. As shown in FIG. 14(b), the electrophoretic particles 5a gather around the pixel electrodes 3 and the electrophoretic particles 5b gather around the transparent electrode 4. Consequently, in this case, the color viewed from the transparent substrate 2 side turns out to be the color of the electrophoretic particles 5b, i.e., black.

When the thin-film transistors 30 apply voltages so that one pixel electrode 3 has a negative potential, the other pixel electrode 3 has a positive potential, and the transparent electrode 4 has a zero potential, as shown in FIG. 14(c), the white electrophoretic particles 5a gather in a region of the transparent electrode 4 corresponding to the pixel electrode 3 with the negative potential, and the black electrophoretic particles 5b gather in a region of the transparent electrode 4 corresponding to the pixel electrode 3 with the positive potential. Consequently, in this case, the color viewed from the transparent substrate 2 side turns out to be a mixture of the colors of the electrophoretic particles 5a and the electrophoretic particles 5b, i.e., gray.

By employing such a construction, the electrophoretic device 20 can display more multi-gradation images.

In the construction shown in the drawing, although the numbers of the electrophoretic particles 5a and the electrophoretic particles 5b which are dispersed in the liquid-phase dispersion medium 6 are substantially the same, the numbers may be changed depending on the purposes.

The average particle size of the electrophoretic particles 5a may be the same as or different from the average particle size of the electrophoretic particles 5b.

The liquid-phase dispersion medium 6 may be substantially transparent (transparent and colorless, transparent and colored, or translucent) or opaque (colorless or colored).

In the electrophoretic device 20 in the tenth embodiment, the same advantages as those in the first embodiment are also obtained.

Additionally, the construction of the electrophoretic dispersion 10 in this embodiment may also be applied to the electrophoretic dispersion 10 in any one of the fourth to ninth embodiments.

Eleventh Embodiment

Next, an electrophoretic device in an eleventh embodiment of the present invention will be described below.

FIG. 15 is a longitudinal sectional view of the electrophoretic device in the eleventh embodiment of the present invention, and FIGS. 16(a) to 16(c) are longitudinal sectional views showing the operation of the electrophoretic device shown in FIG. 15.

The differences between the electrophoretic device in the eleventh embodiment and the electrophoretic devices in the first, second, and tenth embodiments will be mainly described, and a description of the similarities will be omitted.

An electrophoretic device 20 in the eleventh embodiment is the same as the electrophoretic device in the second embodiment except that the electrophoretic dispersion 10 has a different construction.

That is, in the electrophoretic device 20 in the eleventh embodiment, an electrophoretic dispersion 10 similar to that in the tenth embodiment is used.

As shown in FIGS. 16(a) to 16(c), by changing the voltage application pattern to each pixel electrode 3, the individual electrophoretic particles 5a and 5b can be caused to migrate in the liquid-phase dispersion medium 6 as in the tenth embodiment.

By employing such a construction, the electrophoretic device 20 can display more multi-gradation images.

In the electrophoretic device 20 in the eleventh embodiment, the same advantages as those in the first, second, and tenth embodiments are also obtained.

Additionally, the construction of the electrophoretic dispersion 10 in this embodiment may also be applied to the electrophoretic dispersion 10 in the third embodiment.

Twelfth Embodiment

Next, an electrophoretic device in a twelfth embodiment of the present invention will be described below.

FIGS. 17(a) to 17(b) are longitudinal sectional views showing the operation of an electrophoretic device in an eleventh embodiment of the present invention.

The differences between the electrophoretic device in the twelfth embodiment and the electrophoretic devices in the first and second embodiments will be mainly described, and a description of the similarities will be omitted.

An electrophoretic device 20 in the twelfth embodiment is the same as the electrophoretic device in the second embodiment except that the electrophoretic dispersion layer 11 has a different construction.

That is, in the electrophoretic dispersion layer 11 in the twelfth embodiment, different types of electrophoretic dispersions 10a and 10b are encapsulated in the individual capsule bodies 41, and the adjacent microcapsules 40a and 40b have different constructions.

In the electrophoretic dispersion 10a, the electrophoretic particles 5a are dispersed in a liquid-phase dispersion medium 6. On the other hand, in the electrophoretic dispersion 10b, the electrophoretic particles 5b are dispersed in the liquid-phase dispersion medium 6. Furthermore, two types of electrophoretic particles 5b having different electrophoretic mobilities are used.

In this embodiment, a case in which the electrophoretic particles 5a are negatively charged and white and the electrophoretic particles 5b are positively charged and black (colored) will be described.

In the electrophoretic device 20, in a state shown in FIG. 17(a), when the thin-film transistors 30 apply voltages so that the pixel electrodes 3 have a negative potential and the transparent electrode 4 has a zero potential to produce a predetermined potential difference, an electric field is generated from the transparent electrode 4 to each pixel electrode 3. As a result, in the capsule 40a, the electrophoretic particles 5a migrate toward the transparent electrode 4. On the other hand, in the capsule 40b, the electrophoretic particles 5b migrate toward the pixel electrode 3. At this stage, as shown in FIG. 17(b), the electrophoretic particles 5a gather around the transparent electrode 4 quickly. On the other hand, among the electrophoretic particles 5b, those which have high electrophoretic mobility reach the pixel electrode 3 side quickly while those which have low electrophoretic mobility remain in the vicinity of the transparent electrode 4. In such a case, the color viewed from the transparent substrate 2 side turns out to be a mixture of the colors of the electrophoretic particles 5a and the electrophoretic particles 5b, i.e., gray.

In this state, when the thin-film transistors 30 apply voltages so as to produce a potential difference that is larger than the previous potential difference, the electrophoretic particles 5b which have low electrophoretic mobility and remain in the vicinity of the transparent electrode 4 also migrate toward and gather around the pixel electrode 3. Consequently, the color viewed from the transparent substrate 2 side turns out to be the color of the electrophoretic particles 5a, i.e., white.

By employing such a construction, the electrophoretic device 20 can display more multi-gradation images.

Additionally, as the electrophoretic particles 5b, one type of electrophoretic particles having substantially the same electrophoretic mobility may be used, or three or more types of electrophoretic particles having different electrophoretic mobilities may be used.

In the construction shown in the drawing, although the numbers of the electrophoretic particles 5a and the electrophoretic particles 5b which are dispersed in the liquid-phase dispersion medium 6 are substantially the same, the numbers may be changed depending on the purposes.

The average particle size of the electrophoretic particles 5a may be the same as or different from the average particle size of the electrophoretic particles 5b.

The electrophoretic particles 5a may also have the same construction as that of the electrophoretic particles 5b.

The liquid-phase dispersion medium 6 may be substantially transparent (transparent and colorless, transparent and colored, or translucent) or opaque (colorless or colored).

In the electrophoretic device 20 in the twelfth embodiment, the same advantages as those in the first and second embodiments are also obtained.

Additionally, the construction of the electrophoretic dispersion layer 11 in this embodiment may also be applied to the electrophoretic dispersion layer 11 in the third embodiment.

The electrophoretic device described above may be built in various types of electronic apparatuses. Electronic apparatuses provided with the electrophoretic devices of the present invention will be described below.

Mobile Phone

First, an embodiment in which the electronic apparatus of the present invention is applied to a mobile phone will be described.

FIG. 18 is a perspective view showing the embodiment in which the electronic apparatus of the present invention is applied to a mobile phone.

A mobile phone 300 shown in FIG. 18 includes a plurality of operation buttons 301, an earpiece 302, a mouthpiece 303, and a display panel 304.

In the mobile phone 300, the display panel 304 includes the electrophoretic device 20 described above.

Digital Still Camera

Next, an embodiment in which the electronic apparatus of the present invention is applied to a digital still camera will be described.

FIG. 19 is a perspective view showing the embodiment in which the electronic apparatus of the present invention is applied to a digital still camera. In FIG. 19, the rear side of the drawing is referred to as "a front surface" and the near side of the drawing is referred to as "a back surface". FIG. 19 also schematically shows the connection to external apparatuses.

A digital still camera 400 shown in FIG. 19 includes a case 401, a display panel 402 provided on the back surface of the case 401, a light-receiving unit 403 disposed on the viewing side (the near side of the drawing in FIG. 19) of the case 401, a shutter button 404, and a circuit board 405.

The light-receiving unit 403 includes, for example, an optical lens, a charge coupled device (CCD), etc.

The display panel 402 performs a display based on the imaging signal of the CCD.

The imaging signal of the CCD at the time when the shutter button 404 is pushed is transferred to and stored in the circuit substrate 405.

In the digital still camera 400 in this embodiment, video signal output terminals 406 and an input/output terminal 407 for data communication are provided on a side of the case 401.

As necessary, the video signal output terminals 406 are, for example, connected to a TV monitor 406A, and the input/output terminal 407 is, for example, connected to a personal computer 407A.

In the digital still camera 400, the imaging signal stored in the memory of the circuit board 405 is output to the TV monitor 406A and the personal computer 407A by a predetermined operation.

In the digital still camera 400, the display panel 402 includes the electrophoretic device 20 described above.

Electronic Book

Next, an embodiment in which the electronic apparatus of the present invention is applied to an electronic book will be described.

FIG. 20 is a perspective view showing the embodiment in which the electronic apparatus of the present invention is applied to an electronic book.

An electronic book 500 shown in FIG. 20 includes a book-shaped frame 501 and a (openable) cover 502 which is attached to the frame 501 in a rotatable manner.

The frame 501 includes a display unit 503 in which the display surface is exposed, and an operation part 504.

In the electronic book 500, the display unit 503 includes the electrophoretic device 20 described above.

Electronic Paper

Next, an embodiment in which the electronic apparatus of the present invention is applied to an electronic paper will be described.

FIG. 21 is a perspective view showing the embodiment in which the electronic apparatus of the present invention is applied to an electronic paper.

An electronic paper 600 shown in FIG. 21 includes a body 601 composed of a rewritable sheet having volume and flexibility similar to paper, and a display unit 602.

In the electronic paper 600, the display unit 602 includes the electrophoretic device 20 described above.

Electronic Notebook

Next, an embodiment in which the electronic apparatus of the present invention is applied to an electronic notebook will be described.

FIG. 22 is a perspective view showing the embodiment in which the electronic apparatus of the present invention is applied to an electronic notebook.

An electronic notebook 700 shown in FIG. 22 includes a cover 701 and sheets of electronic paper 600.

The electronic paper 600 has the same construction as that shown in FIG. 21, and a plurality of sheets of electronic paper are clamped and bound by the cover 701.

The cover 701 is provided with an input means for inputting display data, and the display content can be changed by the input means in the state in which the sheets of electric paper 600 are bound.

In the electronic notebook 700, the electronic paper 600 includes the electrophoretic device 20 described above.

Display

An embodiment in which the electronic apparatus of the present invention is applied to a display will be described.

FIGS. 23(a) and 23(b) are schematic diagrams showing the embodiment in which the electronic apparatus of the present invention is applied to a display. FIG. 23(a) is a sectional view, and FIG. 23(b) is a plan view.

A display (display unit) 800 shown in FIG. 23 includes a body 801 and an electronic paper 600 placed in the body 801 in a detachable manner. The electronic paper 600 has the same construction as that shown in FIG. 21.

A slot 805 through which the electronic paper 600 can be loaded is formed on a side (right side in FIG. 23) of the body 801. Two pairs of feed rollers 802a and 802b are provided in the body 801. When the electronic paper 600 is inserted into the body 801 through the slot 805, the electronic paper 600 is clamped between each pair of feed rollers 802a and 802b in the body 801.

A rectangular aperture 803 is formed on a display surface (the near side of the drawing in FIG. 23(b)) of the body 801, and a transparent glass plate 804 is fitted into the aperture 803. Accordingly, the electronic paper 600 placed in the body 801 can be viewed from the outside of the body 801. That is, in the display 800, the electronic paper 600 placed in the body 801 is viewed through the transparent glass plate 804, thus constituting a display surface.

A terminal section 806 is disposed at the end (left side in FIG. 23) in the inserting direction of the electronic paper 600, and a socket 807 to which the terminal section 806 is connected when the electronic paper 600 is placed in the body 801 is disposed in the body 801. The socket 807 is electrically connected to a controller 808 and an operation part 809.

In the display 800, the electronic paper 600 is placed in the body 801 in a detachable manner, and can be detached from the body 801 and moved for use.

In the display 800, the electronic paper 600 includes the electrophoretic device 20 described above.

In addition of the electronic devices described above, examples of the electronic devices include televisions, viewfinder type or monitor-direct-view type video tape recorders, car navigation devices, pagers, electronic pocketbooks, electronic calculators, electronic newspapers, word processors, personal computers, workstations, television telephones, POS terminals, and apparatuses provided with touch panels. The electrophoretic device 20 fabricated by the method described above is applicable to the display section of each of these various electronic apparatuses.

The preferred embodiments of the electrophoretic devices, methods for fabricating electrophoretic devices, and electronic apparatuses of the present invention have been described above. It is to be understood that the present invention is not limited thereto.

For example, each component constituting the electrophoretic device of the present invention may be replaced with any other component which functions similarly, or a new component may be added to the electrophoretic device. That is, for example, at least one layer for a given purpose may be included between the circuit board and the electrode and/or the transistor, between the counter substrate and the counter electrode, etc.

For example, in the method for fabricating the electrophoretic device of the present invention, any given step may be incorporated.

For example, in the present invention, at least any two of the first to twelfth embodiments may be combined.

In the electrophoretic device in each of the embodiments described above, the electrophoretic dispersion layer is sandwiched between a pair of electrodes. The present invention is not limited thereto. In the electrophoretic device of the present invention, for example, an electrophoretic dispersion layer may be disposed on or above the electrodes which are deposited on each other or which are arrayed in the horizontal direction (in the planar direction).

Advantages

As described above, in accordance with the present invention, since the electrophoretic dispersion layer and the transistors are separated from each other by the circuit board, the thin-film transistors can be prevented from being degraded (chemically degraded)

Since the pixel electrode and the transistor are electrically connected to each other by the conducting part which extends through the circuit board, electrical contact between the transistor and the pixel electrode is ensured, and fabrication is enabled without applying excessive stress. As a result, it is possible to prevent the individual components from being degraded or damaged.

What is claimed is:

1. An electrophoretic device comprising:
a first substrate provided with an electrode;
an electrophoretic dispersion layer containing an electrophoretic dispersion, the layer being disposed over a surface of the electrode remote from the first substrate;
a transistor disposed on a surface of the first substrate remote from the electrophoretic dispersion layer, the transistor applying a voltage to the electrophoretic dispersion layer through the electrode; and
a conducting part extending through the first substrate and electrically connecting the electrode and the transistor to each other.

2. An electrophoretic device according to claim 1, further comprising a counter electrode facing the electrode.

3. An electrophoretic device according to claim 2, wherein the counter electrode is light transmissive.

4. An electrophoretic device according to claim 2, wherein the electrophoretic dispersion layer comprises a portion interposed between the electrode and the counter electrode.

5. An electrophoretic device according to claim 2, further comprising a counter substrate disposed on a surface of the counter electrode remote from the electrophoretic dispersion layer, the counter substrate being opposed to the first substrate.

6. An electrophoretic device according to claim 5, wherein the counter substrate is light transmissive.

7. An electrophoretic device according to claim 1, wherein the electrophoretic dispersion layer comprises a plurality of capsules containing the electrophoretic dispersion.

8. An electrophoretic device according to claim 1, wherein the electrophoretic dispersion layer contains at least one type of electrophoretic particles.

9. An electrophoretic device according to claim 1, wherein the electrophoretic dispersion layer contains a plurality of types of electrophoretic particles having different properties.

10. An electrophoretic device according to claim 7, wherein, the electrophoretic dispersion contains a plurality of types of electrophoretic particles having different properties.

11. An electrophoretic device according to claim 9, wherein the properties comprise at least one of a charge property, electrophoretic mobility, and a color property.

12. An electrophoretic device according to claim 1, wherein the electrode is disposed in a recess formed in the surface of the first substrate.

13. An electrophoretic device according to claim 1, wherein the electrode and the transistor are disposed for each pixel.

14. An electrophoretic device according to claim 13, wherein a number of electrodes and a number of transistors are equal.

15. An electrophoretic device according to claim 14, wherein each electrode and a corresponding transistor are disposed on the first substrate at positions offset from each other in a planar direction of the first substrate.

16. An electrophoretic device according to claim 14, further comprising an equal number of signal lines as that of the electrodes, wherein each transistor is connected between a corresponding electrode and a corresponding signal line so that a signal can be input into the electrode individually.

17. An electrophoretic device according to claim 14, further comprising a plurality of signal lines and a plurality of scanning lines substantially orthogonal to the signal lines, wherein one of the electrodes and one of the transistors are disposed in a vicinity of each intersection between the signal lines and the scanning lines.

18. An electrophoretic device according to claim 1, wherein the first substrate has a multilayered structure.

19. An electrophoretic device according to claim 17, wherein the first substrate has a multilayered structure, and each of the signal lines and each of the scanning lines are provided on different layers.

20. An electrophoretic device according to claim 1, wherein the first substrate is flexible.

21. An electrophoretic device according to claim 1, wherein the transistor is a thin-film transistor.

22. An electrophoretic device according to claim 21, wherein the thin-film transistor at least partially comprises an organic material.

23. An electrophoretic device according to claim 21, wherein the thin-film transistor is at least partially formed by an ink-jet process.

24. An electrophoretic device according to claim 1, wherein the transistor is in contact with the first substrate.

25. An electrophoretic device according to claim 24, wherein the transistor is obtained by at least partially separating semiconductor unit from a substrate that is different from the first substrate and then bonding the semiconductor unit to the surface of the first substrate.

26. An electrophoretic device according to claim 1, further comprising a semiconductor unit which controls the transistor.

27. An electrophoretic device according to claim 26, wherein the semiconductor unit is disposed on a surface of the first substrate on which the transistor is disposed.

28. An electrophoretic device according to claim 26, wherein the semiconductor unit comprises a shift register circuit for sending data, a latch circuit for storing data, and a voltage transducer circuit for amplifying data.

29. An electronic apparatus comprising an electrophoretic device according to claim 1.

30. A method for making an electrophoretic device comprising:
  a first step of forming an electrode on a first substrate;
  a second step of forming a conducting part so as to extend through the first substrate and come into contact with the electrode;
  a third step of forming a transistor so as to be in contact with the conducting part on the first substrate remote from the electrode; and
  a fourth step of forming an electrophoretic dispersion layer containing an electrophoretic dispersion on the electrode remote from the first substrate.

31. A method for making an electrophoretic device according to claim 30, wherein, in the first step, a recess is formed in a surface of the first substrate and the electrode is disposed in the recess.

32. A method for making an electrophoretic device according to claim 30, wherein, in the third step, the transistor is formed so as to be in contact with the first substrate.

33. A method for making an electrophoretic device according to claim 32, wherein, in the third step, the transistor is obtained by at least partially separating a semiconductor unit from a substrate that is different from the first substrate and then bonding the semiconductor unit to the surface of the first substrate.

34. A method for making an electrophoretic device according to claim 30, wherein the transistor is a thin-film transistor.

35. A method for making an electrophoretic device according to claim 34, wherein the thin-film transistor at least partially comprises an organic material.

36. A method for making an electrophoretic device according to claim 34, wherein the thin-film transistor is at least partially formed by an ink-jet process.

37. A method for making an electrophoretic device according to claim 30, wherein, in the fourth step, the electrophoretic dispersion layer is at least partially interposed between the electrode and a counter electrode opposed thereto.

38. A method for making an electrophoretic device according to claim 30, wherein, in the fourth step, the electrophoretic dispersion layer is formed by arraying a plurality of capsules containing the electrophoretic dispersion.

39. A method for making an electrophoretic device according to claim 30, further comprising a step of forming a semiconductor unit which controls the transistor on the first substrate on a side on which the transistor is disposed.

40. A method for making an electrophoretic device according to claim 30, wherein the first substrate has a multilayered structure.

41. A method for making an electrophoretic device according to claim 30, wherein the first substrate is flexible.

42. A method for making an electrophoretic device according to claim 30, wherein the electrode and the transistor are disposed for each pixel.

43. A method for making an electrophoretic device according to claim 42, wherein a number of electrodes and a number of transistors are equal.

* * * * *